United States Patent
Chujo et al.

(12) 
(10) Patent No.: US 6,243,462 B1
(45) Date of Patent: Jun. 5, 2001

(54) ECHO CANCELLER AND METHOD OF CONTROLLING THE SAME

(75) Inventors: Kaoru Chujo; Naoji Fujino, both of Kanagawa (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/025,463

(22) Filed: Feb. 18, 1998

(30) Foreign Application Priority Data

Sep. 8, 1997 (JP) .................................................. 9-242248

(51) Int. Cl.$^7$ ..................................................... H04M 9/08
(52) U.S. Cl. ............................................. 379/410; 455/570
(58) Field of Search ..................................... 379/406–411; 455/570

(56) References Cited

U.S. PATENT DOCUMENTS 5,841,856 * 11/1998 Ide ........................................ 379/406

FOREIGN PATENT DOCUMENTS 62-88444  4/1987 (JP) .

* cited by examiner

*Primary Examiner*—Wing F. Chan
(74) *Attorney, Agent, or Firm*—Helfgott & Karas, P.C.

(57) ABSTRACT

On the basis of tap coefficients which a tap coefficient updating circuit updates in succession, a maximum-tap position detecting unit, a fluctuation width detecting unit and a comparator detect a state where the transmission delay time of an echo path exceeds the echo control time of an echo canceller. In a case where the state has been detected, a changeover controlling unit stops an echo cancelling operation which includes a process for subtracting a pseudo echo signal from a send-in signal.

18 Claims, 16 Drawing Sheets

HYBRID: HYBRID DEVICE FOR 2-WIRE / 4-WIRE
EC: ECHO CANCELLER

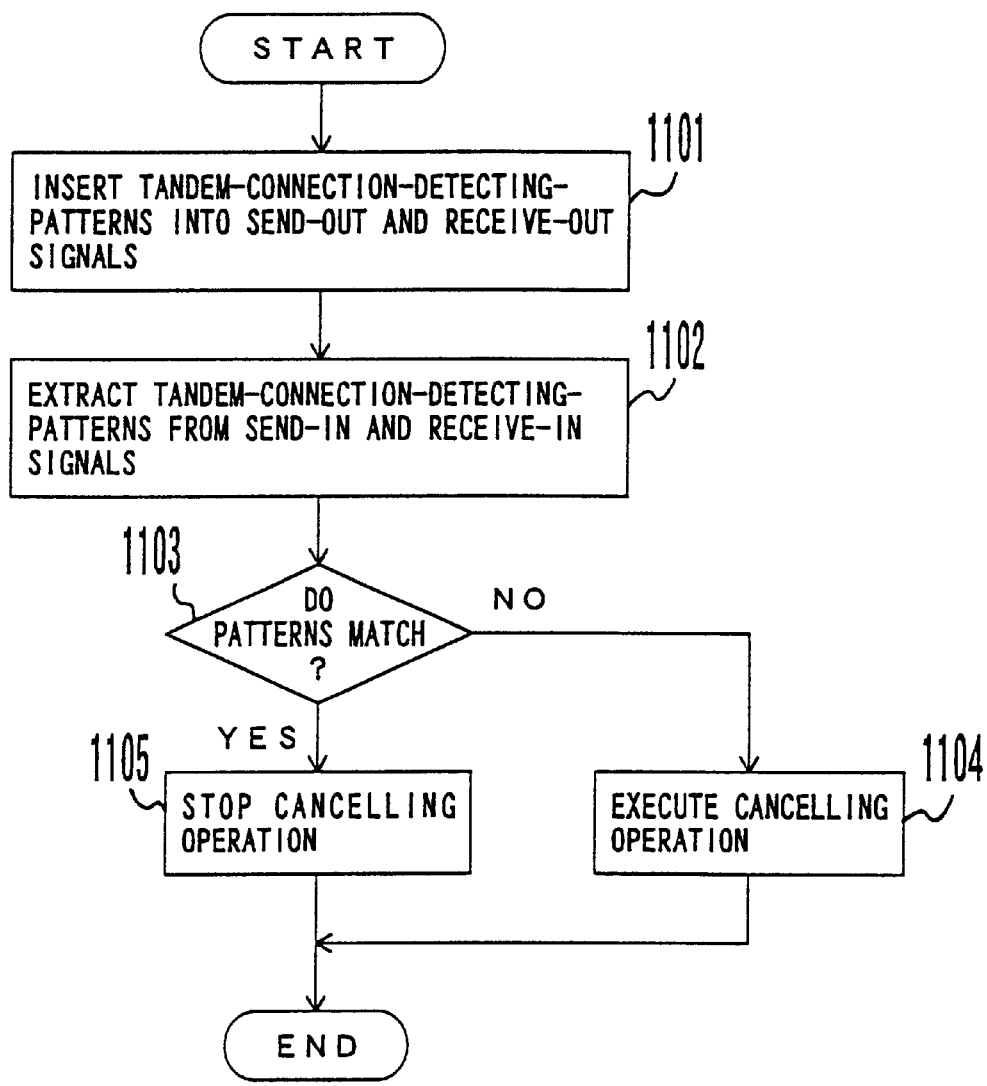
F I G. 1 1

ECHO CANCELLER AND METHOD OF CONTROLLING THE SAME

BACKGROUND OF THE INVENTION

1. Field of the Invention

The present invention relates to an echo canceller for improving a speech quality etc. in a telephone network etc.

2. Description of the Related Art

Echo cancellers are installed for such purposes as preventing the deterioration of a speech quality attributed to echoes which occur in, for example, 2-wire/4-wire converting hybrid devices included in various telephone networks etc. in order to mutually switch 2-wire transmission lines and 4-wire transmission lines.

Heretofore, echo cancellers have been often employed for suppressing echoes which occur in networks of long transmission lines and great transmission delays, such as a satellite communication network, etc.

Further, in recent years, techniques in which a transmission band is compressed by a voice CODEC (voice coder/decoder) so as to reduce the transmission rate of voice have extensively come into practical use, and echo cancellers have been extensively applied in order to eliminate echoes ascribable to processing delays which are involved in such CODECS. Concretely, the echo cancellers have come into wide use in radio networks such as the base station system of mobile terminals, etc.

Besides, as a telephone network and an ATM (asynchronous transfer mode) network are integrated more in the future, the necessity of echo cancellers will rise due to the increases of processing delays attendant upon the disassembly/assembly of ATM cells, etc.

FIG. 1 is a diagram for explaining the applied positions of echo cancellers for suppressing echoes which occur in 2-wire/4-wire converting hybrid devices (hereinbelow, simply termed "hybrid devices").

Referring to FIG. 1, the echo of a speaker "A" signifies a signal which is so produced that part of the voice of the speaker "A" leaks into the reception line of the speaker "A" in the hybrid device (Hybrid) 101(#B) on the side of a speaker "B". The echo of the speaker "A" is suppressed by the echo canceller (EC) 102(#A) (hatched part) which is installed on the speaker-B side. A path which extends from the echo canceller 102(#A) back to the same 102(#A) via the hybrid device 101(#B) on the speaker-B side is called the "echo path" 103 of the echo canceller 102(#A). In addition, with respect to the echo canceller 102(#A), the speaker "A" is called a "far-end speaker", and the speaker "B" is a "near-end speaker".

Conversely, the echo of the speaker "B" signifies a signal which is so produced that part of the voice of the speaker "B" leaks into the reception line of the speaker "B" in the hybrid device 101(#A) on the speaker-A side. The echo of the speaker "B" is suppressed by the echo canceller (EC) 102(#B) which is installed on the speaker-A side. Although not especially shown in the figure, the echo path of the echo canceller 102(#B) extends from the echo canceller 102(#B) back to the same 102(#B) via the hybrid device 101(#A) on the speaker-A side. In addition, a far-end speaker with respect to the echo canceller 102(#B) is the speaker "B", while a near-end speaker is the speaker "A".

As delays involved between the speakers "A" and "B" are longer, a transmission delay to occur therebetween increases more. Accordingly, the speaker "A" comes to hear later the echo arising from his/her own voice and to more conspicuously perceive the echo as being offensive to the ear.

FIG. 2 is a block diagram showing the prior-art construction of the echo canceller 102 depicted in FIG. 1.

Generally, in the echo canceller 102, a tap coefficient updating unit 204 successively updates N tap coefficients exhibiting the characteristics of the echo path 103 and successively held in a tap coefficient memory 203, on the basis of residual echo signals 212 successively outputted from a subtracter 210 and receive-in signals 205 successively held in a tap memory 202. It holds the updated tap coefficients in the tap coefficient memory 203 anew.

Besides, an adaptive FIR (Finite Impulse Response) filter 201 executes a convolution calculation for the receive-in signals 205 successively held in the tap memory 202 and the N tap coefficients successively updated by the tap coefficient updating unit 204, thereby to generate a pseudo or artificial echo signal 209. That is, the adaptive FIR filter 201 is a filter which realizes the characteristics of the echo path 103. Here, the echo path 103 is assumed to have linear characteristics, which are estimated as an impulse response. Further, the adaptive FIR filter 201 is implemented as a transversal filter which executes the convolution calculation of a finite impulse response (FIR) approximating the impulse response of the linear characteristics.

The tap coefficient updating unit 204 calculates the updated values of the respective values of the N tap coefficients from the residual echo signals 212 outputted from the subtracter 210 and the receive-in signals 205 successively held in the tap memory 202, every sampling point and on the basis of, for example, an algorithm called "learning identification". Subsequently, using the N updated values, the tap coefficient updating unit 204 updates the respective values of the N tap coefficients calculated at the last sampling point and held in the tap coefficient memory 203. Also, the tap coefficient updating unit 204 outputs the resulting N tap coefficients to the coefficient setting portion of the adaptive FIR filter 201 and holds them in the tap coefficient memory 203 anew.

Here, since a conventional echo canceller assumes white noise as the receive-in signal, the echo cannot be completely removed in a situation where background noise enters the actual voice signal or the near-end speaker side. In particular, when the transmission delay of the echo path increases, the influence thereof becomes conspicuous. As shown in FIG. 2, therefore, a processor 211 called "NLP (nonlinear processor)" is inserted on the output side of the subtracter 210 included in the echo canceller 102. The NLP 211 executes such a process that, if the level of the residual echo signal 212 outputted from the subtracter 210 does not exceed a certain level, the signal is forcibly made zero by way of example. Accordingly, the process is a kind of nonlinear process. However, in a case where the speakers "A" and "B" are talking at the same time or where the near-end speaker is talking, the state is detected by a superposed-talk detecting circuit or the like not especially shown, and the operation of the NLP 211 is stopped.

As stated before, it is premised for the echo canceller 102 that the echo path 103 has the linear characteristics, which can be simulated by the adaptive FIR filter 201. Herein, the tap length of the adaptive FIR filter 201 is set at a length which can cover the maximum time period supposable as the transmission delay of the echo path 103, in consideration of a network to which the echo canceller 102 is connected. A time period corresponding to the length is called an "echo control time". More concretely, the tap length of the adaptive FIR filter 201 is usually set at a time length which is obtained in such a way that an impulse response time arising in the hybrid device 101 is added to the maximum transmission delay time of the echo path 103.

By way of example, in a telephone network laid within the State of Japan, the maximum delay time of the echo path 103 is said to be on the order of 40–50 [msec] in and around Tokyo. It is known that the echo does not offend the ear within such limits.

Recently, especially in a mobile-type network such as PHS network or portable telephone network, etc., an overall transmission delay involved in the network tends to increase due to the increases of transmission delays developing in a radio line portion, a voice CODEC and a line multiplexer/demultiplexer which are included in the network. In the mobile-type network, therefore, echo cancellers have come to be often inserted into a base station etc.

Problematic here are the following two points:

1. Let's consider a case shown in FIG. 3 where an STM (synchronous transfer mode) network 301 and an ATM (asynchronous transfer mode) network 302 which are mobile-type networks, and an STM network 303 which is a stationary-type network are connected through cell assembling/disassembling units 304 and 305, etc. The transmission delay time of the echo path 103 tends to increase as viewed from the echo canceller 102 which is installed in the base station or the like. Consequently, there might occur a situation where the transmission delay time of the echo path 103 exceeds the echo control time of the echo canceller 102.

2. The echo cancellers 102 are installed in, e. g., the mobile-type network, etc. anew. Accordingly, there might appear the tandem connection of at least two echo cancellers 102, such as the connection of the echo canceller 102 on the side of the echo path 103 and the echo canceller 102 on the side of a transit trunk as shown in FIG. 4.

Originally, the designer of a network ought to sufficiently grasp the positions and characteristics of echo cancellers 102 which are installed in the network. In actuality, however, he/she is sometimes difficult of fully grasping the circumstances of the network.

In the above case-1, the echo canceller 102 cannot operate normally, to pose such a problem that noise occurs.

In the above case-2 as exemplified in FIG. 4, the NLP 211 for the nonlinear operation exists in the echo canceller 102 on the echo path side, and hence, the echo path 103 no longer has the linear characteristics as viewed from the echo canceller 102 on the transit trunk side. Therefore, the echo canceller 102 on the transit trunk side fails to generate the optimum pseudo echo signal 209 (refer to FIG. 2), and such a problem as the occurrence of noise might be similarly posed.

SUMMARY OF THE INVENTION

The present invention has been made with the background stated above, and has for its object to avoid the occurrence of noise, etc. by detecting, and coping with, a case where the transmission delay time of an echo path exceeds the echo control time of an echo canceller, and a case where the tandem connection of at least two echo cancellers appears.

The present invention is premised on an echo canceller wherein a group of tap coefficients are successively updated on the basis of a residual echo signal (212) and receive-in signals (205) successively received, a pseudo or artificial echo signal (209) is generated by a filter (adaptive FIR filter 201) whose inputs are the receive-in signals and whose filter coefficients are the group of tap coefficients, the pseudo echo signal (209) is subtracted from a send-in signal (207), thereby to execute an echo cancelling operation for the send-in signal (207), and a send-out signal (208) is delivered on the basis of a result of the subtraction.

Herein, the first aspect of the present invention has the following construction, which serves to solve the case-1 stated before:

First, the echo canceller comprises an echo-cancelling-operation-state detecting unit which detects a state where a transmission delay time of an echo path exceeds an echo control time of the echo canceller, on the basis of the tap coefficients successively updated. By way of example, the unit includes a maximum-tap-position detecting unit (a maximum-tap position detecting unit 502) which detects a tap position of the tap coefficient having a maximum value, every sampling timing in a state where a predetermined time period has lapsed since beginning of a call and where the receive-in signal is not a narrow-band signal; a fluctuation-width detecting unit (a fluctuation width detecting unit 503) which detects a fluctuation width of the tap position; and a comparison unit (a comparator 504) which detects the state where the transmission delay time of the echo path exceeds the echo control time of the echo canceller, on the basis of the detected fluctuation width.

Secondly, the echo canceller comprises an echo-cancelling-operation stopping unit (a changeover controlling unit 505) which stops the echo cancelling operation, including a process for subtracting the pseudo echo signal from the send-in signal, when the aforementioned state has been detected by the echo-cancelling-operation-state detecting unit.

Owing to the above construction of the first aspect of the present invention, when the transmission delay time of the echo path has exceeded the echo control time of the echo canceller, the echo cancelling operation is no longer performed, and hence, an echo is contained in the send-out signal, with the result that a far-end speaker perceives the echo. Since, however, the occurrence of noise attributed to an abnormal, echo cancelling operation is suppressed, the unpleasant feeling of the far-end speaker can be relieved sensorially.

The second aspect of the present invention has the following construction, which serves to solve the case-2 stated before:

First, the echo canceller comprises a linear-data-0 detecting unit (a linear data "0" detecting unit 702) which detects a state where "0"s of linear data succeed as the send-in signal.

Secondly, the echo canceller comprises an echo-cancelling-operation stopping unit (a changeover controlling unit 703) which stops the echo cancelling operation, including a process for subtracting the pseudo echo signal from the send-in signal, when the state has been detected.

Owing to the above construction of the second aspect of the present invention, the echo cancelling operation is no longer performed within the echo canceller which is tandem-connected to the echo canceller nearer to an echo path. Therefore, the occurrence of noise attributed to an abnormal, echo cancelling operation caused by the tandem connection is suppressed.

The third aspect of the present invention has the following construction:

In the first place, the echo canceller comprises a first, tandem-connection-detecting-pattern inserting unit (a tandem-connection-detecting-pattern inserting unit 902) which inserts a tandem-connection-detecting-pattern into the receive-in signal, and which delivers resulting signal as a receive-out signal.

Secondly, the echo canceller comprises a second, tandem-connection-detecting-pattern inserting unit (a tandem-connection-detecting-pattern inserting unit 904) which inserts the tandem-connection-detecting-pattern into the send-out signal, and which delivers a resulting signal.

Also comprised is a first, tandem-connection-detecting-pattern detecting unit (a tandem-connection-detecting-pattern detecting unit 903) which extracts the tandem-connection-detecting-pattern from the receive-in signal.

Further comprised is a second, tandem-connection-detecting-pattern detecting unit (a tandem-connection-detecting-pattern detecting unit 905) which extracts the tandem-connection-detecting-pattern from the send-in signal.

Besides, the echo canceller comprises an echo-cancelling-operation stopping unit (a changeover controlling unit 906) which stops the echo cancelling operation, including a process for subtracting the pseudo echo signal from the send-in signal, when the tandem-connection-detecting-pattern has been extracted by both of the first, tandem-connection-detecting-pattern detecting unit and the second, tandem-connection-detecting-pattern detecting unit.

Owing to the above construction of the third aspect of the present invention, the occurrence of noise attributed to an abnormal, echo cancelling operation caused by the tandem connection is suppressed in the echo canceller which is tandem-connected midway of a network.

The fourth aspect of the present invention has the following construction:

First of all, the echo canceller comprises a tandem-connection-detecting-pattern inserting unit (a tandem-connection-detecting-pattern inserting unit 902) which inserts a tandem-connection-detecting-pattern into the receive-in signal, and which delivers a resulting signal as a receive-out signal. The tandem-connection-detecting-pattern inserting unit can be so constructed as to insert -the tandem-connection-detecting-pattern corresponding to a signal level of the receive-in signal, into the receive-in signal, and to deliver a resulting signal as the receive-out signal.

Also comprised is a tandem-connection-detecting-pattern detecting unit (a detecting unit 903 for the tandem-connection-detecting-pattern) which extracts the tandem-connection-detecting-pattern from the receive-in signal.

Further, the echo canceller comprises a detected-result-tandem-connection-pattern inserting unit (a detected-result-tandem-connection-pattern inserting unit 1203) which inserts a detected-result-tandem-connection-pattern into the send-out signal and delivers a resulting signal, when the tandem-connection-detecting-pattern detecting unit has extracted the tandem-connection-detecting-pattern. The detected-result-tandem-connection-pattern inserting unit can be so constructed as to insert the detected-result-tandem-connection-pattern into the send-out signal and to deliver a resulting signal, when the tandem-connection-detecting-pattern extracted by the tandem-connection-detecting-pattern detecting unit corresponds to the signal level of the current receive-in signal.

Also comprised is a detected-result-tandem-connection-pattern detecting unit (a detected-result-tandem-connection-pattern deciding unit 1202) which extracts the detected-result-tandem-connection-pattern from the send-in signal.

Besides, the echo canceller comprises an echo-cancelling-operation stopping unit (a changeover controlling unit 906) which stops the echo cancelling operation, including a process for subtracting the pseudo echo signal from the send-in signal, when the detected-result-tandem-connection-pattern has been extracted by the detected-result-tandem-connection-pattern detecting unit.

Owing to the above construction of the fourth aspect of the present invention, the echo cancelling operation is no longer performed in the tandem-connected echo canceller which is other than the echo canceller on an echo path side, so that the occurrence of noise attributed to an abnormal, echo cancelling operation caused by the tandem connection is suppressed.

In the above construction of the third or fourth aspect of the present invention, the tandem-connection-detecting-pattern or the detected-result-tandem-connection-pattern can be so formed as to be transmitted in such a way that, in a train of samples of a digital signal which is the receive-in signal, the receive-out signal, the send-in signal or the send-out signal, least significant bits of a plurality of samples at intervals of a predetermined number of samples are bit-stolen, whereupon bits of bit data constituting the tandem-connection-detecting-pattern or the detected-result-tandem-connection-pattern are respectively inserted into the plurality of least significant bits.

Owing to such a method of insertion, it is permitted to minimize the deteriorations of the characteristics of the main signals and to reliably detect the tandem connection.

The fifth aspect of the present invention has the following construction:

First, the echo canceller comprises an echo-cancelling-operation-state detecting unit (502–504, 1506) which detects a state where a transmission delay time of an echo path exceeds an echo control time of the echo canceller, on the basis of the tap coefficients successively updated.

Secondly, the echo canceller comprises an echo-control-time-information inserting unit (a detected-result-tandem-connection-pattern and echo-control-time-information inserting unit 1502) which inserts information on the echo control time into the send-out signal so as to report the state to another echo canceller connected in tandem, when the state has been detected.

Further, the echo canceller comprises an echo-control-time-information detecting unit (a detected-result-tandem-connection-pattern and the echo-control-time-information deciding unit 1503) which detects the information on the echo control time from the send-in signal.

Besides, the echo canceller comprises a delay adjusting unit (a delay adjusting memory 1504) which delays the receive-in signal a time period corresponding to the detected information on the echo control time, and which inputs a delayed signal to the filter.

Owing to the above construction of the fifth aspect of the present invention, the plurality of tandem-connected echo cancellers can execute the echo cancelling operations in cooperation.

By the way, the present invention can be constructed as methods of controlling echo cancellers which have functions equivalent to the functions actualized by the echo cancellers described above.

BRIEF DESCRIPTION OF THE DRAWINGS

Other objects and features of the present invention will be readily understood by one skilled in the art from the description of the preferred embodiments of the invention when read in conjunction with the accompanying drawings, wherein:

FIG. 11 is a flowchart showing the operation of the third preferred embodiment of the present invention;

DESCRIPTION OF THE PREFERRED EMBODIMENTS

Now, the preferred embodiments of the present invention will be described in detail with reference to the drawings.

First Preferred Embodiment of the Invention

Figure 5:
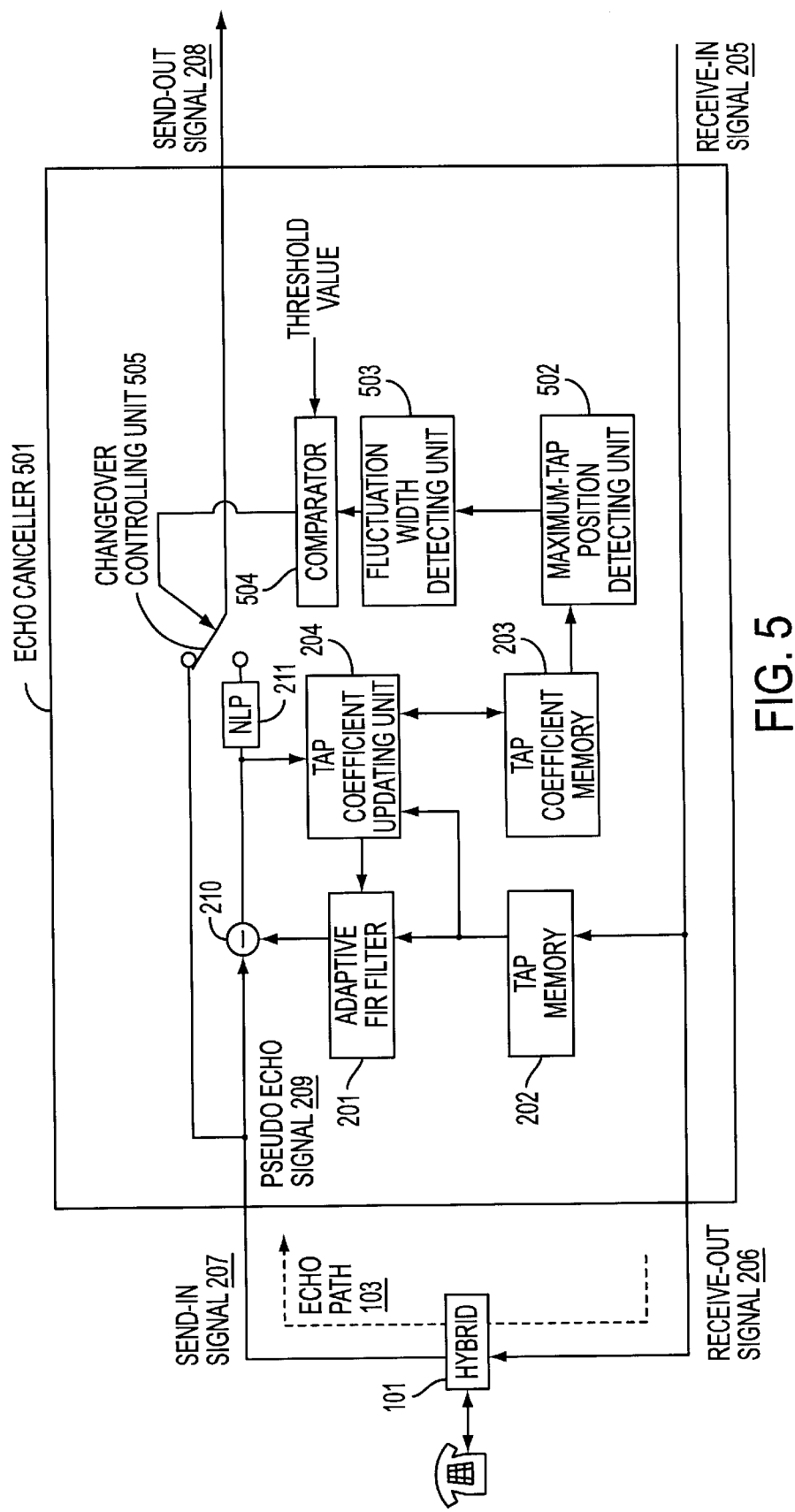
FIG. 5 is a block diagram showing the construction of the first preferred embodiment of the present invention.

FIG. 5 is a block diagram showing the construction of an echo canceller in the first preferred embodiment of the present invention.

Figure 1:
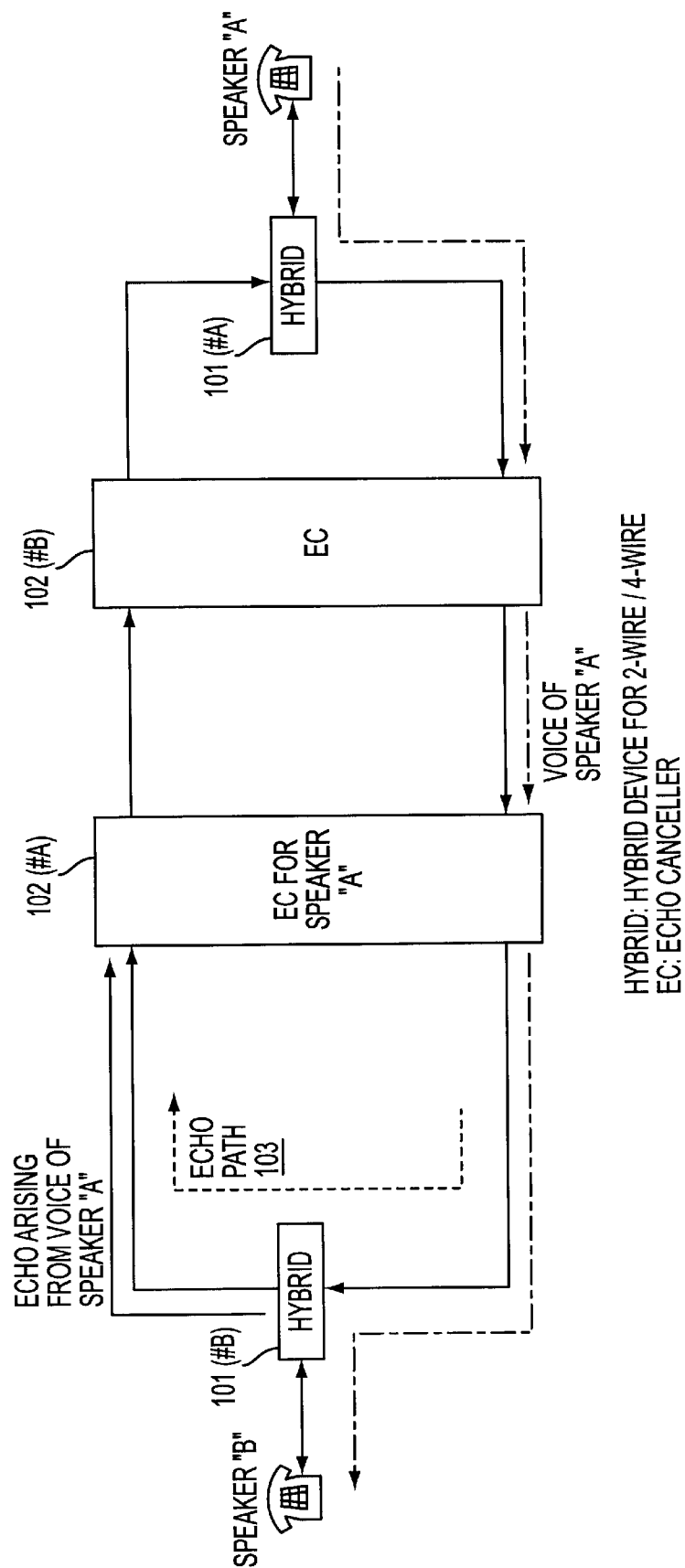
FIG. 1 is a diagram for explaining the applied positions of echo cancellers.
Figure 2:
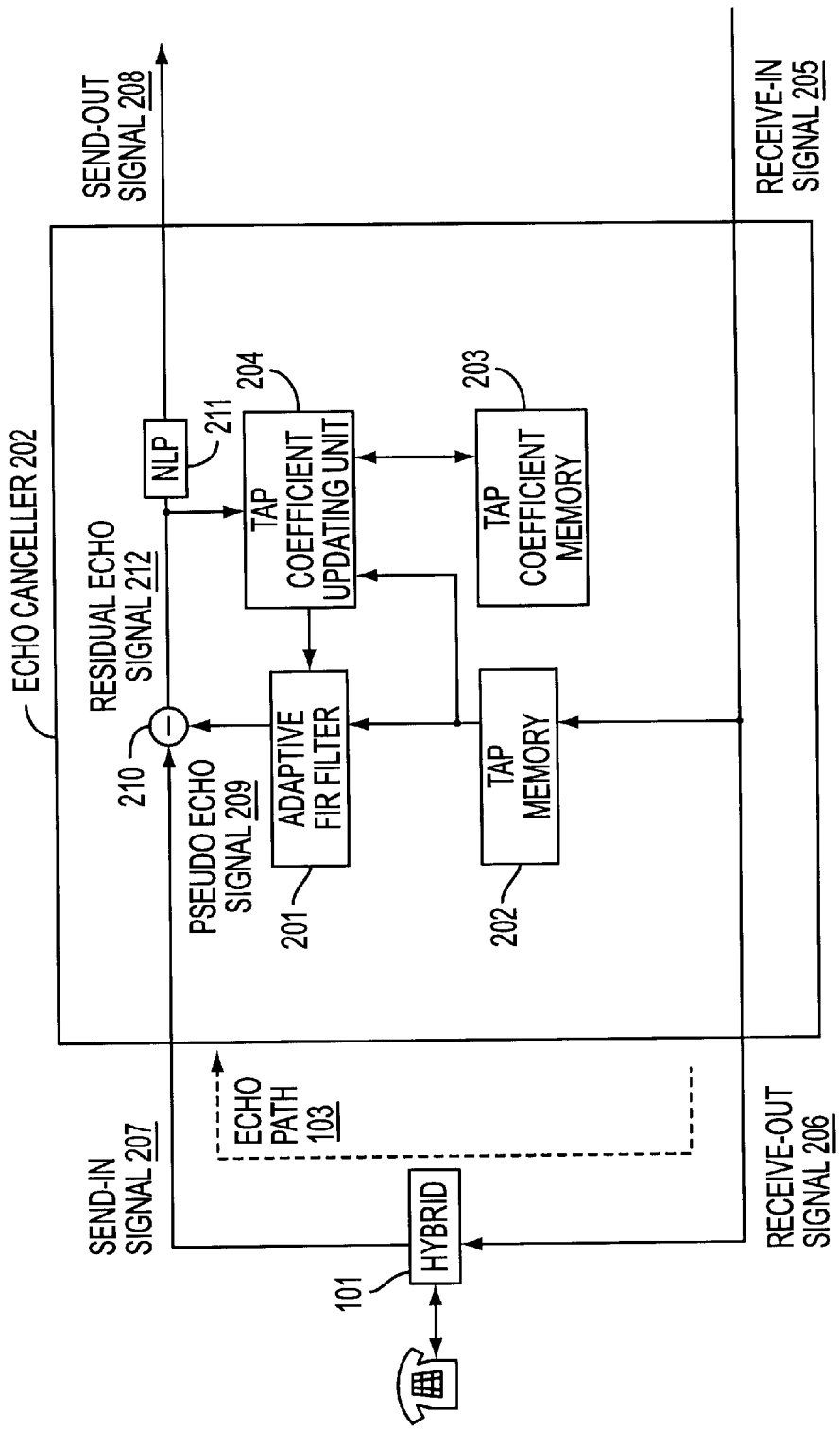
FIG. 2 is a block diagram showing the prior-art construction of the echo canceller.
Figure 3:
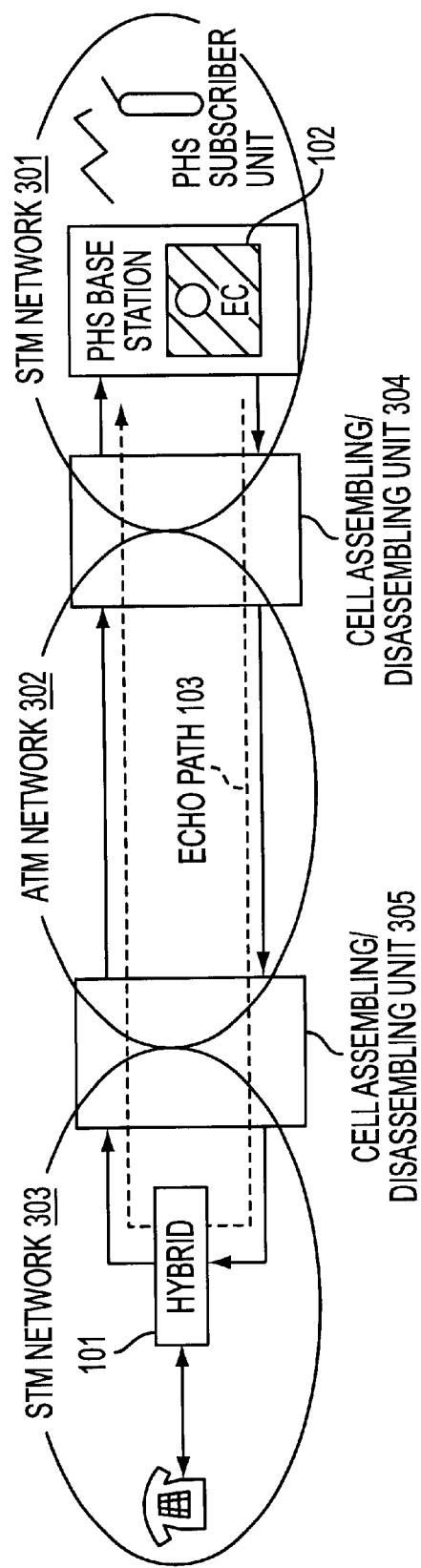
FIG. 3 is a diagram for explaining an example of a case where an echo-path delay time exceeds an echo control time.

In the figure, respective portions which bear the same numerals as in the foregoing case of FIGS. 1 and 2 have the same functions as in these figures.

The echo canceller 501 in the first preferred embodiment features that a state where the transmission delay time of an echo path 103 exceeds the echo control time of the echo canceller 501 is detected on the basis of tap coefficients successively held in a tap coefficient memory 203, and that an echo cancelling operation is stopped upon the detection of the state.

More concretely, the echo canceller 501 detects the state where the transmission delay time of the echo path 103 exceeds the echo control time of the echo canceller 501, as a case where the fluctuation width of the position of the tap coefficient having the maximum value exceeds a predetermined magnitude, in the state in which a predetermined time period has lapsed since the beginning of the connection of a call and in which a narrow-band signal is not inputted as a receive-in signal 205.

The characteristics of the echo path 103 differ every network. However, once the echo canceller 501 has been installed at a predetermined position in a network, the characteristics of the echo path 103 corresponding to the echo canceller 501 hardly change.

The echo canceller 501 starts the operation of estimating the echo path 103, after the connection of the call. Therefore, the value of the tap coefficient changes greatly before the estimation is optimized. After the optimization of the estimation, however, the value of the tap coefficient does not change considerably any longer on condition that the transmission delay time of the echo path 103 lies within the echo control time. On the other hand, in the case where the transmission delay time of the echo path 103 exceeds the echo control time, the normal estimating operation cannot be executed, and the value of the tap coefficient is not stabilized.

In the echo canceller 501 of the first preferred embodiment, therefore, a maximum-tap position detecting unit 502 monitors the respective values of the N tap coefficients and detects the position of the tap coefficient having the maximum value, after the predetermined time period has lapsed since the beginning of the connection of the call.

Subsequently, a fluctuation width detecting unit 503 detects the fluctuation width of the positions of the tap coefficients having the maximum values as are successively detected by the maximum-tap position detecting unit 502.

Besides, a comparator 504 compares each of the fluctuation widths successively detected by the fluctuation width detecting unit 503, with a predetermined threshold value. When predetermined conditions to be explained later have held true, the comparator 504 commands a changeover controlling unit 505 to skip the operation of subtracting a pseudo or artificial echo signal 209 by a subtracter 210 (that is, the echo cancelling operation) and the operation of an NLP (nonlinear processor) 211.

Consequently, in the case where the transmission delay time of the echo path 103 has exceeded the echo control time, the echo cancelling operation is no longer performed, and hence, a send-out signal 208 contains an echo, which a far-end speaker perceives. Since, however, the occurrence of noise attributed to an abnormal, echo cancelling operation is suppressed, the unpleasant feeling of the far-end speaker can be relieved sensorially.

Meanwhile, in a case where the narrow-band signal such as a push tone signal or a ringback tone signal, etc. has been inputted as the receive-in signal 205, the echo canceller 501 cannot estimate the original echo path 103, and the respective values of the tap coefficients settle down to specific tap-coefficient values. Accordingly, when the maximum-tap position detecting unit 502, fluctuation width detecting unit 503, comparator 504 and changeover controlling unit 505 operate, a narrow-band signal detector or the like not especially shown in FIG. 5 is utilized so as to execute the operation of detecting the state where the transmission delay time of the echo path 103 exceeds the echo control time of the echo canceller 501, only when the narrow-band signal is not entered as the receive-in signal 205. By way of example, the narrow-band signal detector can be so contrived as to successively monitor the numbers of zero crosses of the receive-in signal 205 within a predetermined time period (in other words, the numbers of times which the amplitude of the signal 205 becomes "0") and to deliver an output signal indicating that the receive-in signal 205 is the narrow-band signal, in a case where the numbers of zero crosses successively monitored hardly fluctuate.

Figure 6:
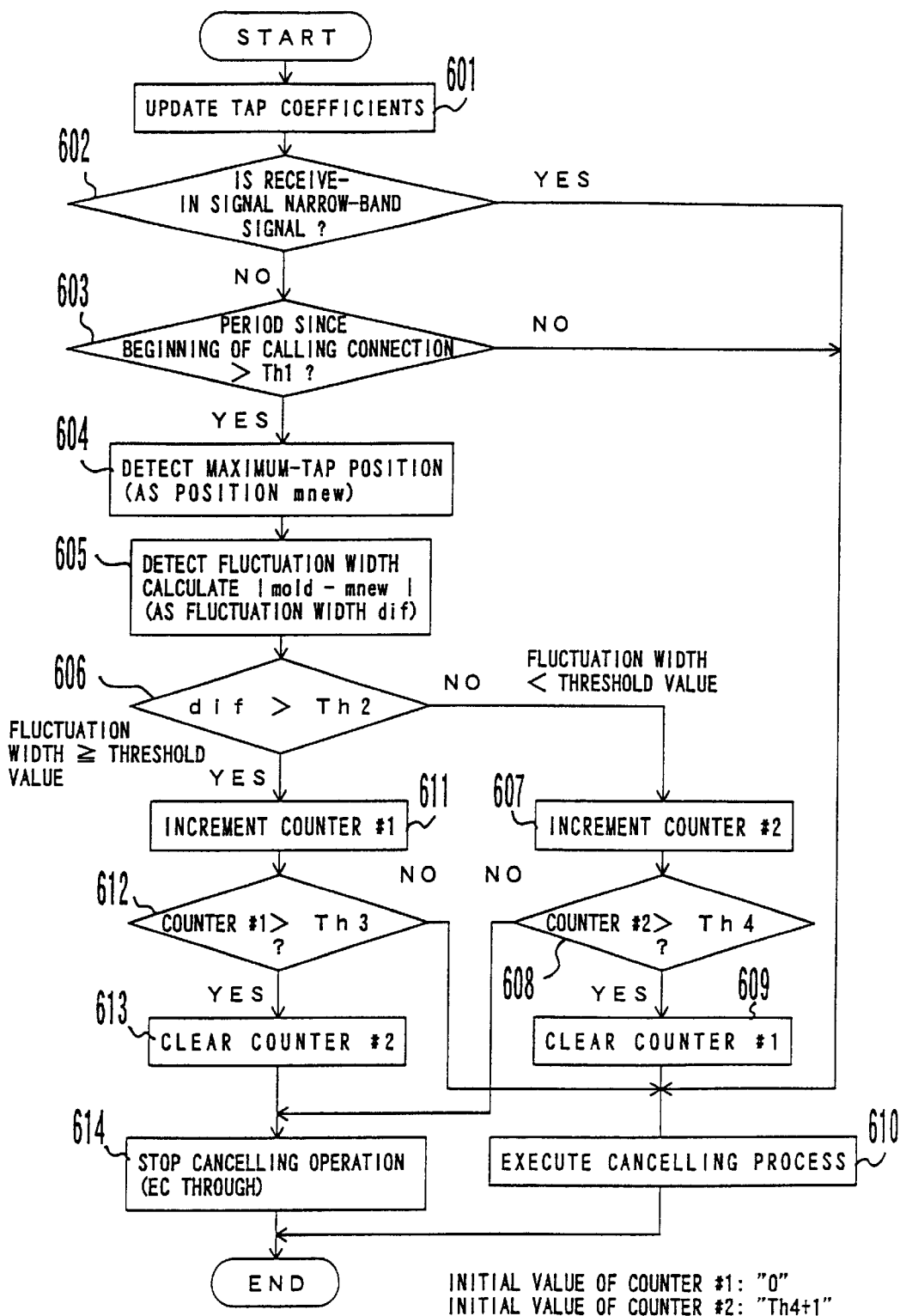
FIG. 6 is a flowchart showing the operation of the first preferred embodiment of the present invention.

FIG. 6 is an operating flowchart showing a control operation which is realized by a tap coefficient updating unit 204, the maximum-tap position detecting unit 502, the fluctuation width detecting unit 503, the comparator 504 and the changeover controlling unit 505 which are shown in FIG. 5. The control operation of the operating flowchart is executed every sampling point.

First, as stated before in conjunction with FIG. 2, the tap coefficient updating unit 204 calculates the updated values of the respective values of N tap coefficients from an error signal outputted from the subtracter 210 and receive-in signals 205 successively held in a tap memory 202, every sampling point and on the basis of, for example, an algorithm called "learning identification". Using the N updated values, the tap coefficient updating unit 204 updates the respective values of the N tap coefficients calculated at the last sampling point and held in the tap coefficient memory 203. Also, the tap coefficient updating unit 204 holds the N tap coefficients in the tap coefficient memory 203 anew (step 601).

Subsequently, the narrow-band signal detector not especially shown decides whether or not the receive-in signal 205 is a narrow-band signal (step 602).

In a case where the receive-in signal 205 has been decided as being the narrow-band signal, i. e., where the decision of step 602 is YES, the control operation proceeds to step 610, at which the ordinary mode of an echo cancelling operation is performed. That is, the changeover controlling unit 505 selects the output of the subtracter 210 as well as the NLP 211.

On the other hand, in a case where the receive-in signal 205 has been decided as not being the narrow-band signal, i. e., where the decision of step 602 is NO, whether or not a time period since the beginning of the connection of a call exceeds a predetermined threshold time "Th1" is decided at step 603. The decision is rendered by, for example, an unshown counter which is reset by a signal reporting the beginning of the connection of the call received from a call processor not especially shown, and which is incremented every predetermined time period.

In a case where the time period since the beginning of the connection of the call does not exceed the predetermined threshold time "Th1", i. e., where the decision of step 603 is NO, the echo cancelling operation is not stable yet. Therefore, step 603 is followed by step 610, at which the ordinary, echo cancelling operation is performed.

On the other hand, in a case where the time period since the beginning of the connection of the call exceeds the predetermined threshold time "Th1", i. e., where the decision of step 603 is YES, the maximum-tap position detecting unit 502 compares the respective values of the N tap coefficients held in the tap coefficient memory 203 anew at step 601 and detects the position of the tap coefficient having the maximum value, as a position "mnew" (step 604).

Subsequently, the fluctuation width detecting unit 503, in which the position of the tap coefficient having the maximum value at the last sampling point is stored as a position "mold", calculates as a fluctuation width "dif" the absolute value |mold-mnew| of the difference between the stored position "mold" and the position "mnew" detected at the current sampling point by the maximum-tap position detecting unit 502 (step 605).

Subsequently, the comparator 504 decides whether or not the fluctuation widths "dif" successively detected by the fluctuation width detecting unit 503 exceeds a predetermined threshold value "Th2" (step 606).

In a case where the fluctuation width "dif" does not exceed the predetermined threshold value "Th2", i. e., where the decision of step 606 is NO, the comparator 504 increments a counter #2 to the amount of +1 (step 607), and whether or not the count value of the counter #2 exceeds a threshold value "Th4" is decided (step 608).

The counter #2 is a variable which is reserved in a register not especially shown or a memory not especially shown. Herein, the counter #2 is initialized to the threshold value "Th4" when the operation of the echo canceller 501 is started. Also, this counter #2 is cleared to a value "0" at step 613 to be explained later, when the state in which the transmission delay time of the echo path 103 exceeds the echo control time of the echo canceller 501 and in which the fluctuation width "dif" is greater than the threshold value "Th2" has continued for, at least, a sampling time period corresponding to a threshold value "Th3". Further, this counter #2 is incremented +1 at step 607 in a case where the fluctuation width "dif" is not greater than the threshold value "Th2" after the establishment of the state in which the transmission delay time of the echo path 103 does not exceed the echo control time of the echo canceller 501. Accordingly, the count value of the counter #2 exceeds the threshold value "Th4" immediately after the operation of the echo canceller 501 has been started, or after a sampling time period corresponding to the threshold value "Th4" has lapsed since the change of the state in which the transmission delay time of the echo path 103 exceeds the echo control time of the echo canceller 501, into the state in which the former does not exceed the latter.

In this manner, when the count value of the counter #2 exceeds the threshold value "Th4" to afford the decision of YES at step 608, the comparator 504 clears the value of a counter #1 to be explained later, to "0" (step 609). Thereafter, this comparator 504 causes the changeover controlling unit 505 to execute the ordinary, echo cancelling operation (step 610). That is, the changeover controlling unit 505 selects the output of the subtracter 210 as well as the NLP 211.

In other words, the ordinary, echo cancelling operation is executed in the case where, since the establishment of the state in which the transmission delay time of the echo path 103 does not exceed the echo control time of the echo canceller 501, the state in which the fluctuation width "dif" is not greater than the threshold value "Th2" has stably continued for the predetermined protective time period corresponding to the threshold value "Th4".

Incidentally, while the count value of the counter #2 does not exceed the threshold value "Th4" to afford the decision of NO at step 608, the control operation proceeds to step 614 to be explained later, at which the stopped state of the echo cancelling operation is continued.

Meanwhile, in a case where the fluctuation width "dif" exceeds the predetermined threshold value "Th2", i. e., where the decision of step 606 is YES, the comparator 504 increments the counter #1 to the amount of +1 (step 611), and it decides whether or not the count value of the counter #1 exceeds the threshold value "Th3" (step 612).

Likewise to the counter #2, the counter #1 is a variable which is reserved in a register not especially shown or a memory not especially shown. Herein, the counter #1 is initialized to the value "0" when the operation of the echo canceller 501 is started. Also, this counter #1 is cleared to the value "0" at step 609 explained before, when the state in which the transmission delay time of the echo path 103 does not exceed the echo control time of the echo canceller 501 and in which the fluctuation width "dif " is not greater than the threshold value "Th2" has continued for, at least, the sampling time period corresponding to the threshold value "Th4". Further, this counter #1 is incremented +1 at step 611 in a case where the fluctuation width "dif" has become greater than the threshold value "Th2" after the establishment of the state in which the transmission delay time of the echo path 103 exceeds the echo control time of the echo canceller 501. Accordingly, the count value of the counter #1 exceeds the threshold value "Th3" after the sampling time period corresponding to the threshold value "Th3" has lapsed since the start of the operation of the echo canceller 501, or after the sampling time period corresponding to the threshold value "Th3" has lapsed since the change of the state in which the transmission delay time of the echo path 103 does not exceed the echo control time of the echo canceller 501, into the state in which the former exceeds the latter.

In this manner, when the count value of the counter #1 exceeds the threshold value "Th3" to afford the decision of YES at step 612, the comparator 504 clears the value of the counter #2 explained before, to "0" (step 613). Thereafter, this comparator 504 causes the changeover controlling unit 505 to stop the echo cancelling operation (step 614). That is, the changeover controlling unit 505 delivers a send-in signal 207 as a send-out signal 208 directly without selecting the output of the subtracter 210 as well as the NLP 211.

In other words, the echo cancelling operation is stopped in the case where, since the establishment of the state in which the transmission delay time of the echo path 103 exceeds the echo control time of the echo canceller 501, the state in which the fluctuation width "dif" is greater than the threshold value "Th2" has continued for the predetermined protective time period corresponding to the threshold value "Th3".

Incidentally, while the count value of the counter #1 does not exceed the threshold value "Th3" to afford the decision of NO at step 612, the control operation proceeds to step 610 explained before, at which the ordinary, echo cancelling operation is continued.

Second Preferred Embodiment of the Invention

Figure 7:
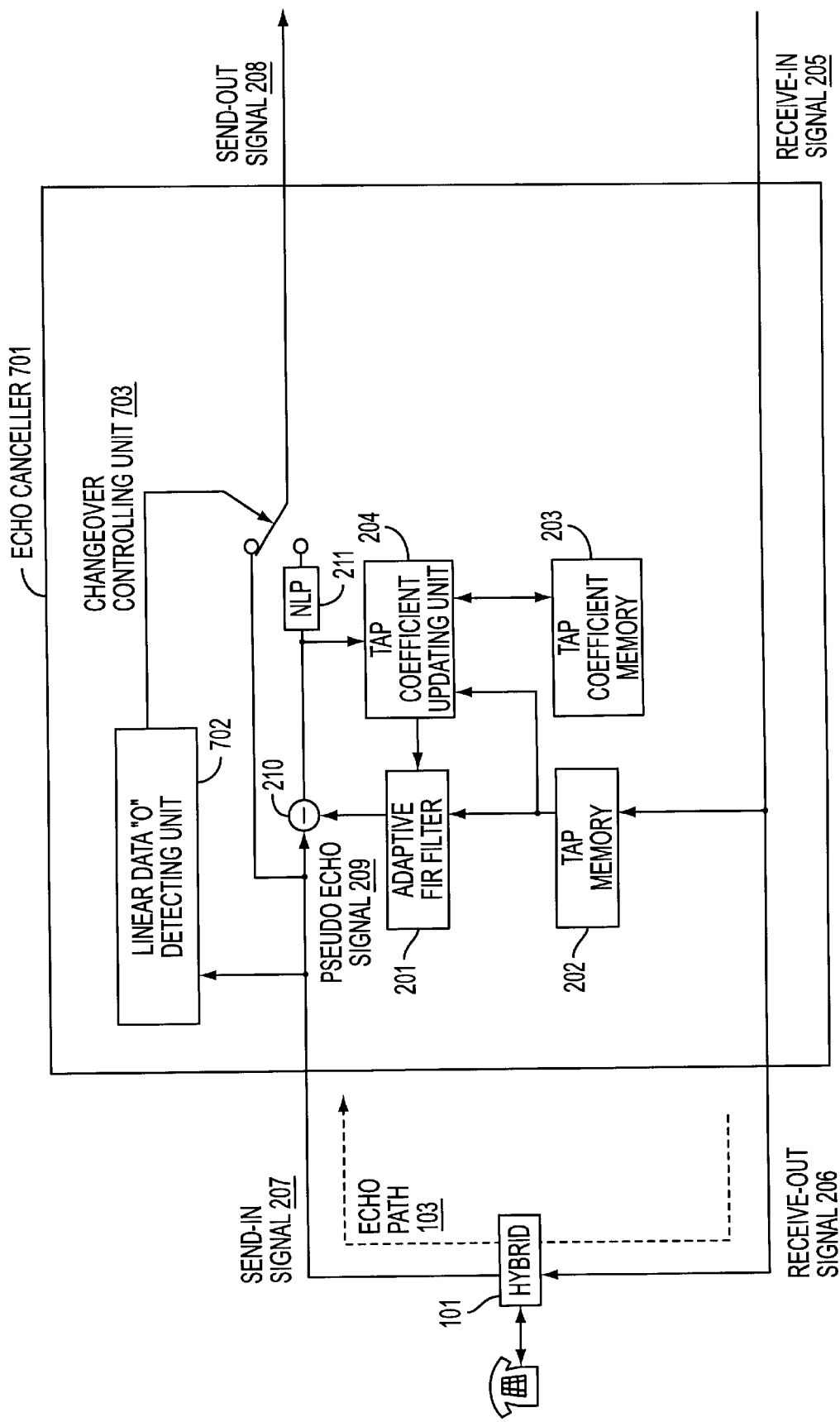
FIG. 7 is a block diagram showing the construction of the second preferred embodiment of the present invention.
Figure 8:
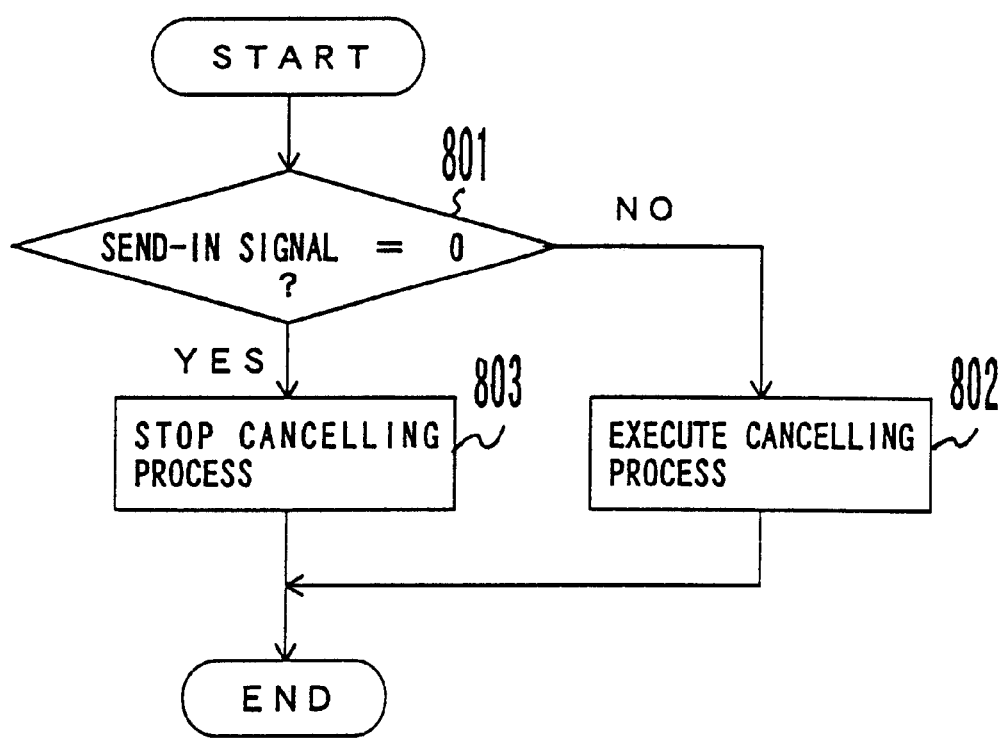
FIG. 8 is a flowchart showing the operation of the second preferred embodiment of the present invention.

FIG. 7 is a block diagram showing the construction of an echo canceller in the second preferred embodiment of the present invention, while FIG. 8 is a flowchart showing the operation of the echo canceller.

In FIG. 7, respective portions which bear the same numerals as in the foregoing case of FIGS. 1 and 2 have the same functions as in these figures.

The echo canceller 701 in the second preferred embodiment features to stop an echo cancelling operation upon detecting that a send-in signal 207 entering the echo canceller 701 is "0" of linear data.

The send-in signal 207 in which an echo signal and background noise on a near-end side (on the side of an echo path 103) are superposed, is inputted to the echo canceller 701. In general, accordingly, the send-in signal 207 is difficult of becoming "0" of the linear data. On the other hand, a scheme for constructing an NLP 211 which is located at the transmission-side output part of the echo canceller 701 is one called the "center clipper scheme". Many of NLPs 211 adopting this scheme deliver "0" of the linear data during their operations.

Accordingly, when the send-in signal 207 entering the echo canceller 701 is "0" of the linear data, it can be considered that an echo canceller including the NLP of the center clipper scheme will be tandem-connected on the side of the echo path 103 of the echo canceller 701.

In the second preferred embodiment shown in FIG. 7, therefore, a linear data '0' detecting unit 702 decides whether or not the send-in signal 207 is "0" of the linear data (step 801 in FIG. 8). In actuality, the linear data "0" detecting unit 702 decides whether or not a state where the send-in signal 207 is "0" of the linear data has continued for a predetermined time period, by the use of a counter or the like.

Herein, in case of the decision that the send-in signal 207 is not in the state of "0" of the linear data (i. e., in a case where the decision of step 801 in FIG. 8 is NO), the linear data "0" detecting unit 702 causes a changeover controlling unit 703 to execute the ordinary mode of the echo cancelling operation (step 802 in FIG. 8). That is, the changeover controlling unit 703 selects the output of a subtracter 210 as well as the NLP 211.

On the other hand, in case of the decision that the send-in signal 207 is in the state of "0" of the linear data (i. e., in a case where the decision of step 801 in FIG. 8 is YES), the linear data "0" detecting unit 702 causes the changeover controlling unit 703 to stop the echo cancelling operation (step 803). That is, the changeover controlling unit 703 delivers the send-in signal 207 as a send-out signal 208 directly without selecting the output of the subtracter 210 as well as the NLP 211.

As a result, the echo cancelling operation is no longer performed in the echo canceller 701 which is connected in tandem with the echo canceller 701 on the side near to the echo path 103, so that the occurrence of noise attributed to an abnormal, echo cancelling operation caused by the tandem connection is suppressed.

Third Preferred Embodiment of the Invention

Figure 9:
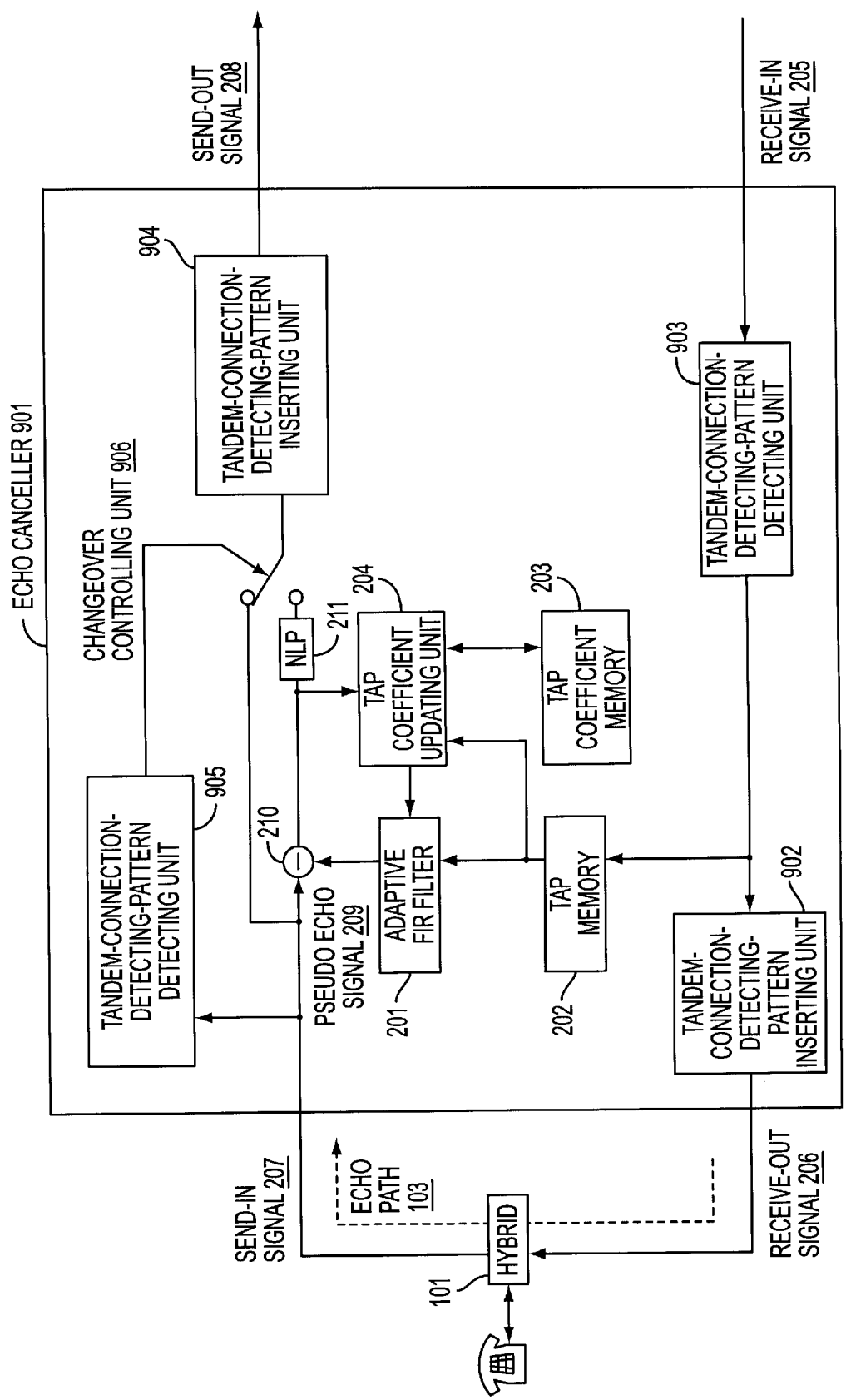
FIG. 9 is a block diagram showing the construction of the third preferred embodiment of the present invention.

FIG. 9 is a block diagram showing the construction of an echo canceller in the third preferred embodiment of the present invention, while FIG. 11 is a flowchart showing the operation of the echo canceller.

In FIG. 9, respective portions which bear the same numerals as in the foregoing case of FIGS. 1 and 2 have the same functions as in these figures.

The echo canceller 901 in the third preferred embodiment is such that tandem-connection-detecting-pattern inserting units 902 and 904 (namely, patterns for detecting a tandem connection) have the functions of inserting the tandem-connection-detecting-patterns into a receive-out signal 206 and a send-out signal 208, respectively (step 1101 in FIG. 11), while tandem-connection-detecting-pattern detecting units 903 and 905 have the functions of detecting the tandem-connection-detecting-patterns from a receive-in signal 205 and a send-in signal 207, respectively (step 1102 in FIG. 11).

On the foregoing occasion illustrated in FIG. 1, the echo canceller 102(#A) which serves to cancel the echo of the speaker "A" arising in the hybrid device 101(#B) on the side of the speaker "B", and the echo canceller 102(#B) which serves to cancel the echo of the speaker "B" arising in the hybrid device 101(#A) on the side of the speaker "A" are installed in opposition to each other through the network (on this occasion, the echo canceller 102(#A) and the echo canceller 102(#B) are not connected in tandem). Now, as to this occasion, let's suppose a case where each of the echo cancellers 102(#A) and 102(#B) has the same construction as that of the echo canceller 901 shown in FIG. 9, and where the echo canceller 901 having the construction shown in FIG. 9 is tandem-connected between the echo cancellers 102(#A) and 102(#B).

In the supposed case, the tandem-connection-detecting-pattern detecting unit 903 included in the echo canceller 901 which is tandem-connected midway of the network detects from the receive-in signal 205 the tandem-connection-detecting-pattern inserted by the tandem-connection-detecting-pattern inserting unit 902 included in the echo canceller 901 which is installed at the preceding stage. Simultaneously, the tandem-connection-detecting-pattern detecting unit 905 included in the middle echo canceller 901 detects from the send-in signal 207 the tandem-connection-detecting-pattern inserted by the tandem-connection-detecting-pattern inserting unit 904 included in the echo canceller 901 which is installed at the succeeding stage.

Meanwhile, the tandem-connection-detecting-pattern detecting unit 903 included in each of the echo cancellers 901 at both of the ends detects from the receive-in signal 205 the tandem-connection-detecting-pattern inserted by the tandem-connection-detecting-pattern inserting unit 902 included in the echo canceller 901 at the preceding stage. However, the tandem-connection-detecting-pattern detecting unit 905 included in each of the same echo cancellers 901 at both of the ends cannot detect the tandem-connection-detecting-pattern from the send-in signal 207 by reason that the send-in signal 207 is a signal on the side of a corresponding echo path 103, and that merely the hybrid device 101 exists on this side.

On the basis of this fact, the tandem-connection-detecting-pattern detecting unit 905 included in the echo canceller 901 decides that the particular echo canceller 901 is tandem-connected midway of the network, only in a case where the tandem-connection-detecting-pattern detecting unit 905 itself and the tandem-connection-detecting-pattern detecting unit 903 have detected the same tandem-connection-detecting-patterns, respectively. Then, the tandem-connection-detecting-pattern detecting unit 905 causes a changeover controlling unit 906 to stop the echo cancelling operation (step 1103→step 1105 in FIG. 11). That is, the changeover controlling unit 906 delivers the send-in signal 207 as the send-out signal 208 directly without selecting the output of a subtracter 210 as well as an NLP 211.

To the contrary, the tandem-connection-detecting-pattern detecting unit 905 included in the echo canceller 901 decides that the particular echo canceller 901 is not tandem-connected midway of the network, in a case where the tandem-connection-detecting-pattern detecting unit 905 itself and the tandem-connection-detecting-pattern detecting unit 903 have not detected the same tandem-connection-detecting-patterns, respectively. Then, the tandem-connection-detecting-pattern detecting unit 905 causes the changeover controlling unit 906 to execute the ordinary, echo cancelling operation (step 1103→step 1104 in FIG. 11). That is, the changeover controlling unit 906 selects the output of the subtracter 210 as well as the NLP 211.

As the result of the above control operation, the echo cancelling operation is no longer performed in the echo canceller 901 tandem-connected midway of the network, so that the occurrence of noise attributed to an abnormal, echo cancelling operation caused by the tandem connection is suppressed.

Figure 10:
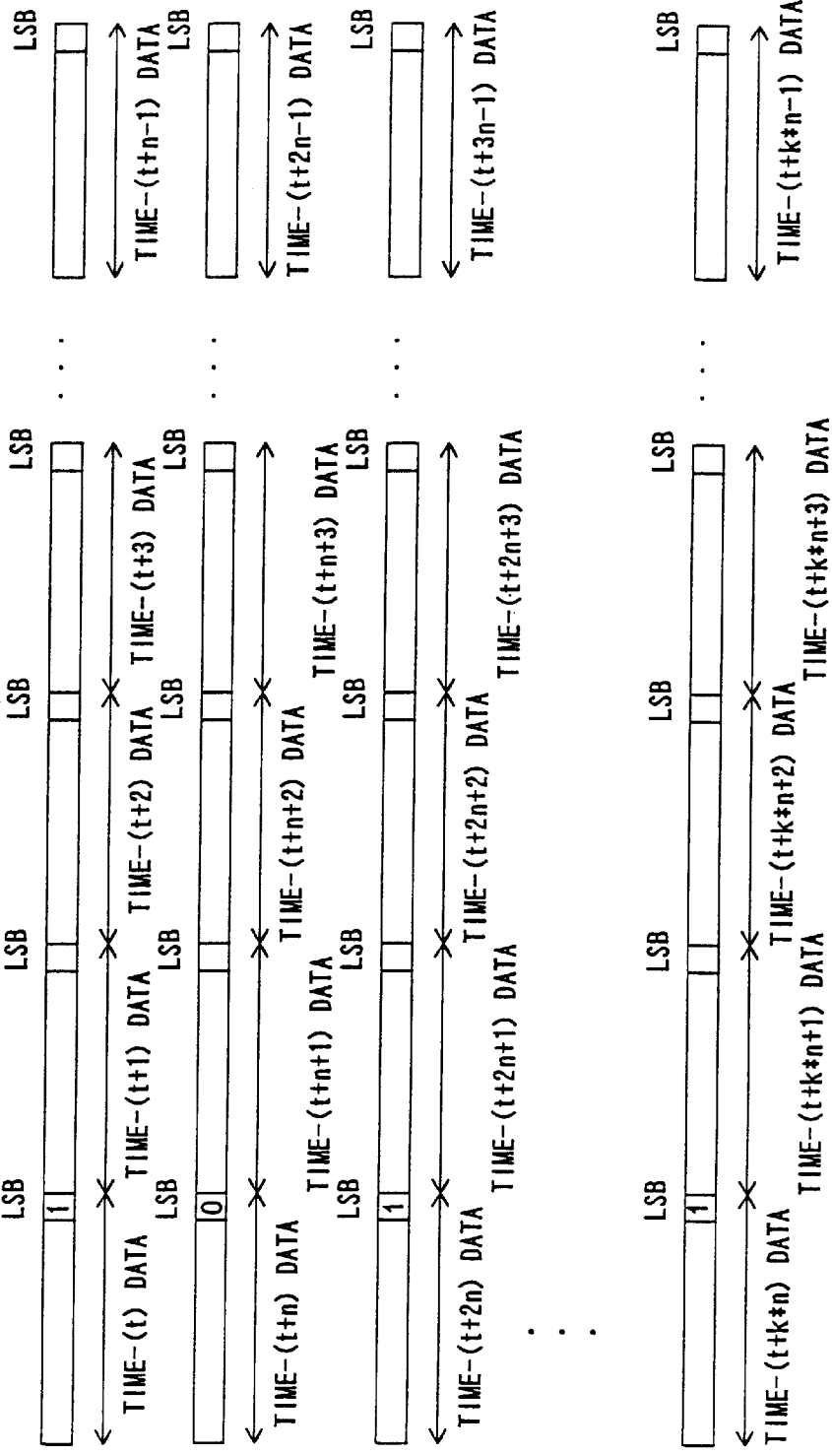
FIG. 10 is a diagram for explaining an example of a method of inserting a tandem-connection-detecting-pattern as well as a detected-result-tandem-connection-pattern.

FIG. 10 is a diagram for explaining an example of a method of inserting the tandem-connection-detecting-pattern into the receive-out signal 206 or the send-out signal 208 by the tandem-connection-detecting-pattern inserting unit 902 or 904 included in the echo canceller 901.

In this example, the tandem-connection-detecting-pattern is transmitted in such a way that, in a train of samples of a digital voice signal which is the receive-out signal 206 or the send-out signal 208, the LSBs (least significant bits) of k samples at intervals of n samples are bit-stolen, whereupon the bits of bit data constituting the tandem-connection-detecting-pattern are respectively inserted into the k LSBs. Owing to such a method of insertion, it is permitted to avoid the deteriorations of the characteristics of the main signal and to reliably detect the tandem connection.

Fourth Preferred Embodiment of the Invention

Figure 12:
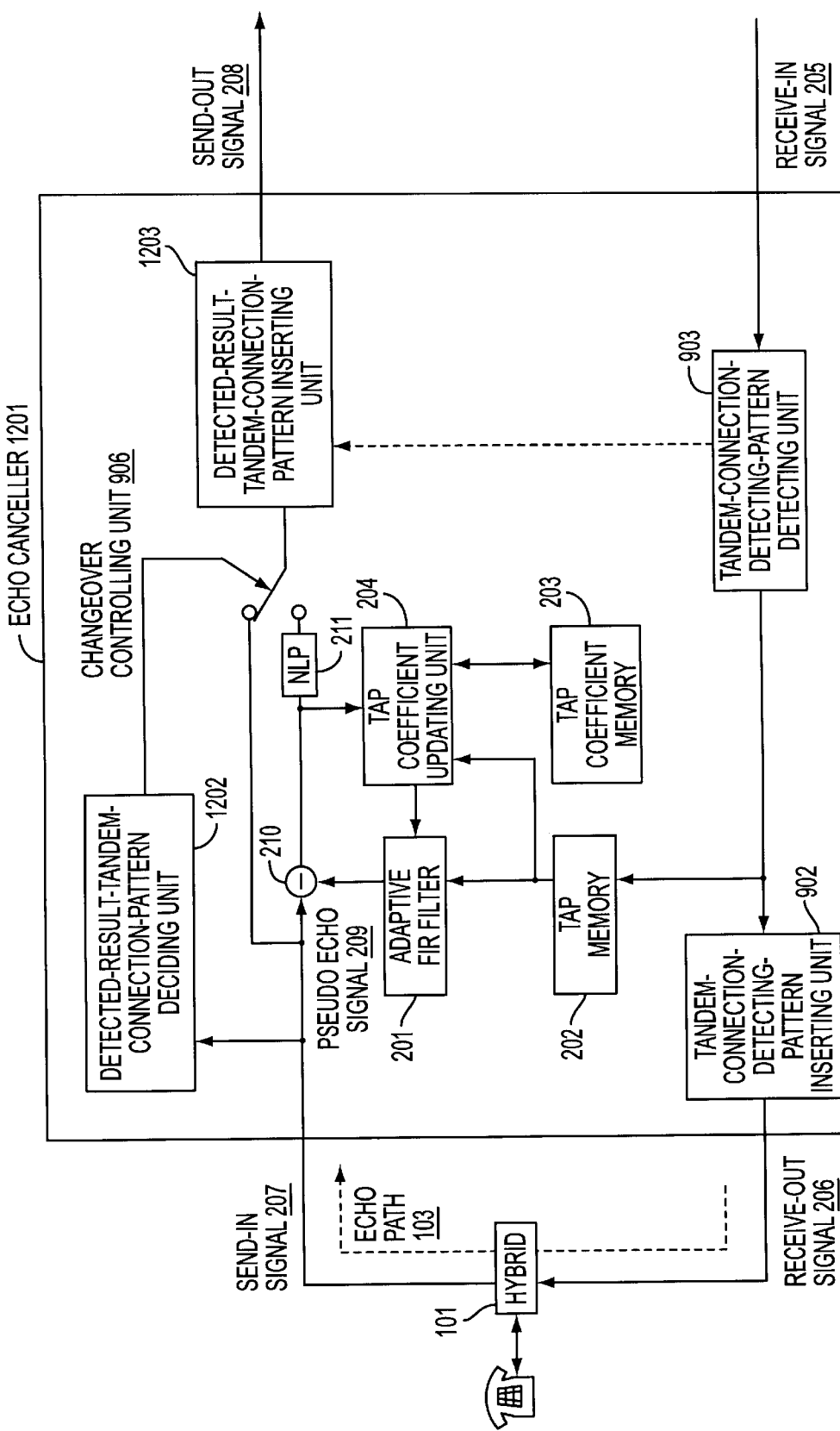
FIG. 12 is a block diagram showing the construction of the fourth preferred embodiment of the present invention.
Figure 13:
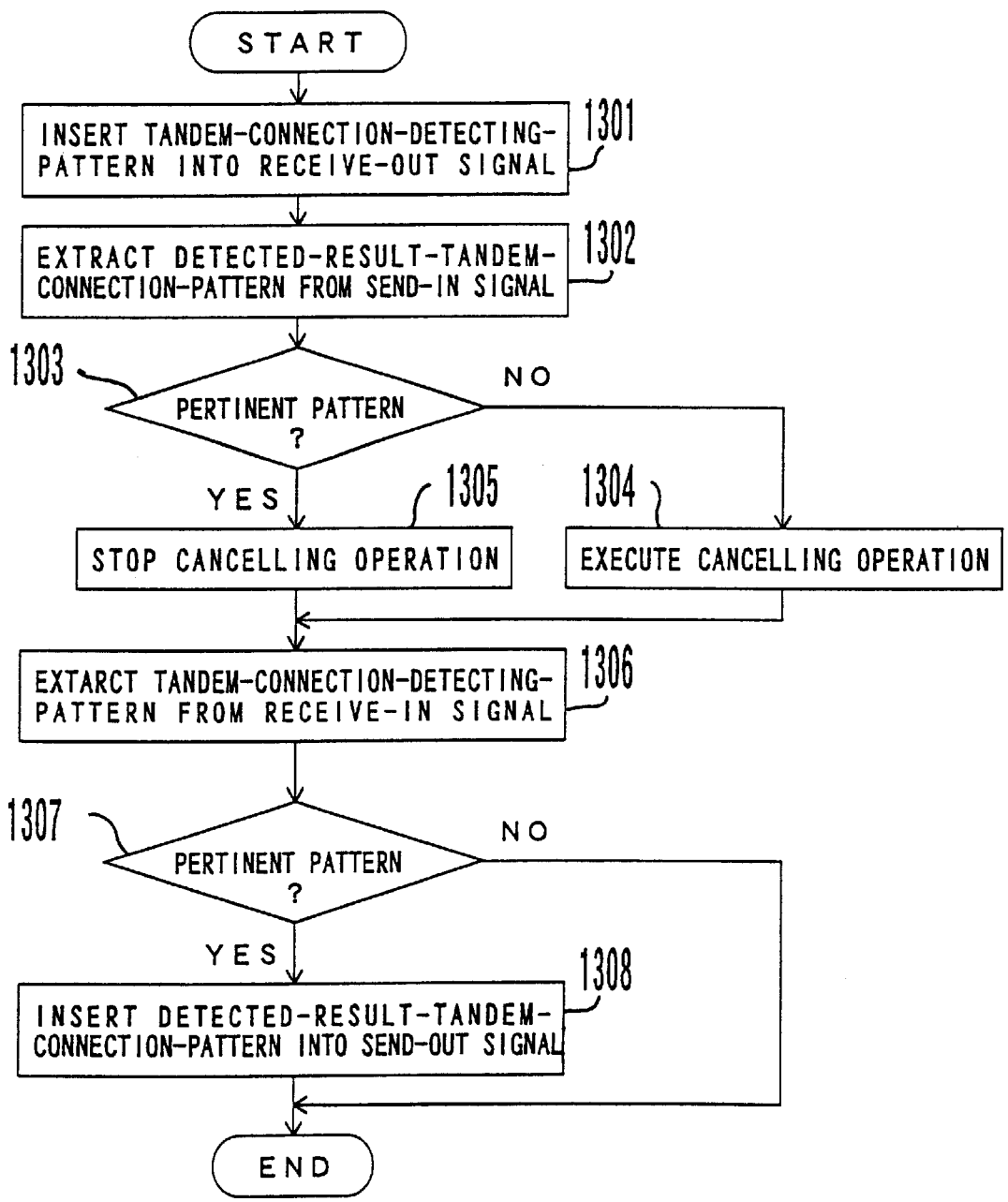
FIG. 13 is a flowchart showing the operation (#1) of the fourth preferred embodiment of the present invention.

FIG. 12 is a block diagram showing the construction of an echo canceller in the fourth preferred embodiment of the present invention, while FIG. 13 is a flowchart showing the operation (#1) of the echo canceller.

In FIG. 12, respective portions which bear the same numerals as in the foregoing cases of FIGS. 9, 1, and 2, have the same functions as in these figures.

The echo canceller 1201 in the fourth preferred embodiment is such that a tandem-connection-detecting-pattern inserting unit 902 has the function of inserting the tandem-connection-detecting-pattern into a receive-out signal 206 (step 1301 in FIG. 13), that a tandem-connection-detecting-pattern detecting unit 903 has the function of detecting the tandem-connection-detecting-pattern from a receive-in signal 205 (step 1306 in FIG. 13), a detected-result-tandem-connection-pattern inserting unit 1203 has the function of inserting the detected-result-tandem-connection-pattern into a send-out signal 208, only in a case where the tandem-connection-detecting-pattern detecting unit 903 has detected the tandem-connection-detecting-pattern (step 1307→step 1308 in FIG. 13), and a detected-result-tandem-connection-pattern deciding unit 1202 has the function of detecting the detected-result-tandem-connection-pattern from a send-in signal 207 (step 1302 in FIG. 13).

Figure 4:
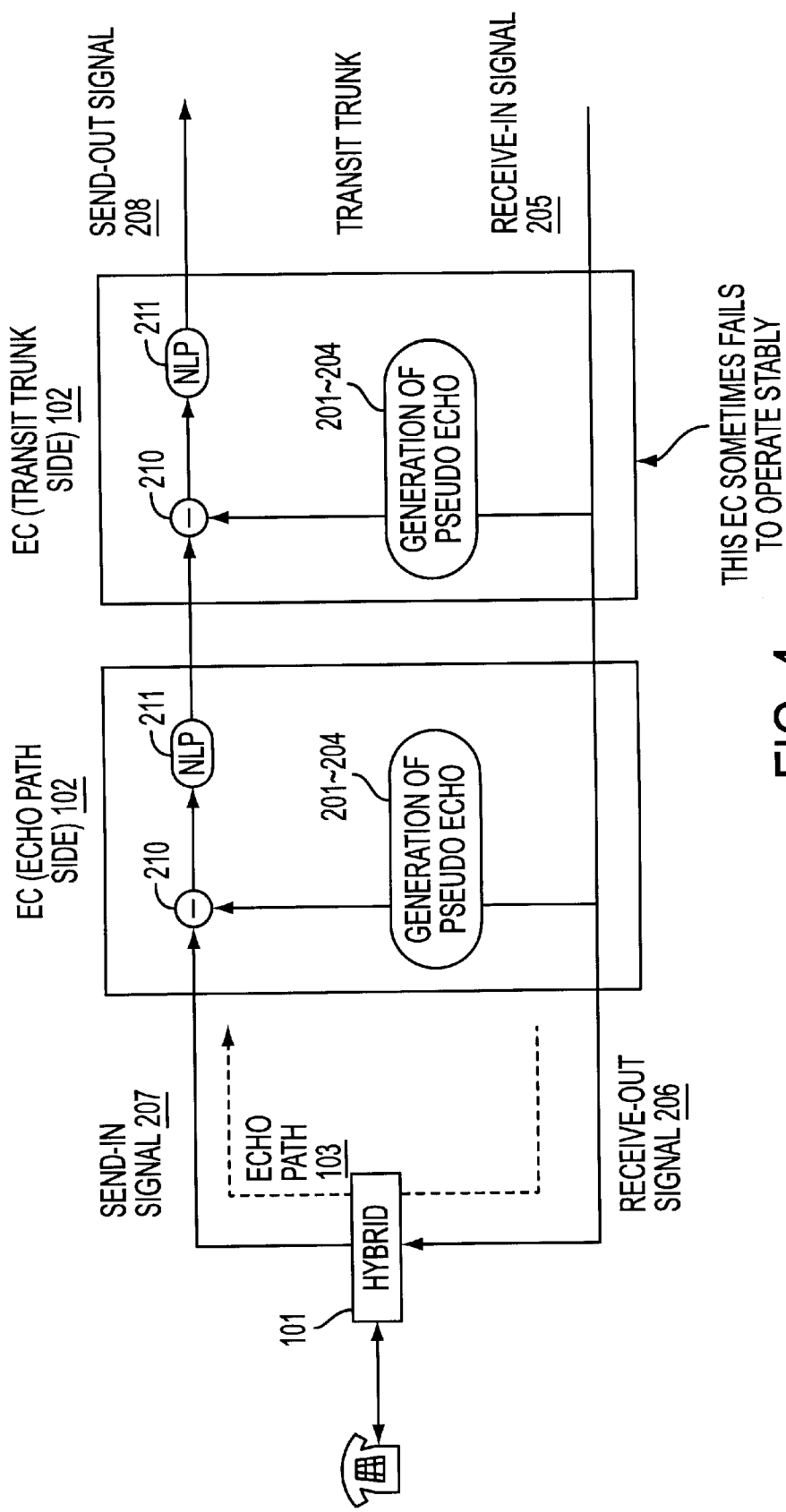
FIG. 4 is a block diagram showing the tandem connection of echo cancellers.

In the foregoing third preferred embodiment of the present invention, there has been described the case where the new echo canceller is tandem-connected midway between the two echo cancellers which are installed in opposition to each other through the network. However, it is not always true that the two echo cancellers are installed in opposition through the network, but the new echo canceller is sometimes connected in tandem with the echo canceller on the side of the single echo path 103 as illustrated in FIG. 4. The fourth preferred embodiment of the present invention presumes such a case.

First, the tandem-connection-detecting-pattern detecting unit 903 included in the echo canceller 1201 nearest to the side of the echo path 103 (hereinbelow, termed the "echo-path-side echo canceller 1201") detects from the receive-in signal 205 the tandem-connection-detecting-pattern inserted by the tandem-connection-detecting-pattern inserting unit 902 which is included in the other echo canceller 1201 at the preceding stage (step 1306 in FIG. 13).

In this case, the detected-result-tandem-connection-pattern inserting unit 1203 included in the echo-path-side echo canceller 1201 inserts the detected-result-tandem-connection-pattern different from the tandem-connection-detecting-pattern, into the send-out signal 208 when the detection of the tandem-connection-detecting-pattern has been reported by the tandem-connection-detecting-pattern detecting unit 903 (step 1307→step 1308 in FIG. 13).

In contrast, the tandem-connection-detecting-pattern inserting unit 902 included in the preceding-stage echo canceller 1201 which is connected to the echo-path-side echo canceller 1201 inserts the tandem-connection-detecting-pattern into the receive-out signal 206 which proceeds toward the echo-path-side echo canceller 1201 (step 1301 in FIG. 13). Besides, the detected-result-tandem-connection-pattern deciding unit 1202 included in the preceding-stage echo canceller 1201 detects from the send-in signal 207 the detected-result-tandem-connection-pattern inserted by the detected-result-tandem-connection-pattern inserting unit 1203 which is included in the echo-path-side echo canceller 1201 (step 1302 in FIG. 13).

Thus, the detected-result-tandem-connection-pattern deciding unit 1202 decides that the particular echo canceller 1201 is tandem-connected midway of the network, and it causes a changeover controlling unit 906 to stop the cancelling operation (step 1303→step 1305 in FIG. 13). That is, the changeover controlling unit 906 delivers the send-in signal 207 as the send-out signal 208 directly without selecting the output of a subtracter 210 as well as an NLP 211.

On the other hand, the detected-result-tandem-connection-pattern deciding unit 1202 included in the echo-path-side echo canceller 1201 cannot detect the detected-result-tandem-connection-pattern from the send-in signal 207 by reason that the send-in signal 207 is a signal on the side of the echo path 103, and that merely the hybrid device 101 exists on this side (that is, the decision of step 1303 in FIG. 13 is NO). In this case, accordingly, the detected-result-tandem-connection-pattern deciding unit 1202 included in the echo-path-side echo canceller 1201 causes the changeover controlling unit 906 to execute the ordinary, echo cancelling operation (step 1303→step 1304 in FIG. 13). That is, the changeover controlling unit 906 selects the output of the subtracter 210 as well as the NLP 211.

An example of a method of inserting the tandem-connection-detecting-pattern into the receive-out signal 206 by the tandem-connection-detecting-pattern inserting unit 902, or an example of a method of inserting the detected-result-tandem-connection-pattern into the send-out signal 208 by the detected-result-tandem-connection-pattern inserting unit 1203 is similar to the example of the method shown in FIG. 10 referred to in the description of the third preferred embodiment of the present invention.

As the result of the above control operation, the echo cancelling operation is no longer performed in the tandem-connected echo canceller 1201 other than the echo-path-side echo canceller 1201, so that the occurrence of noise attributed to an abnormal, echo cancelling operation caused by the tandem connection is suppressed.

Figure 14:
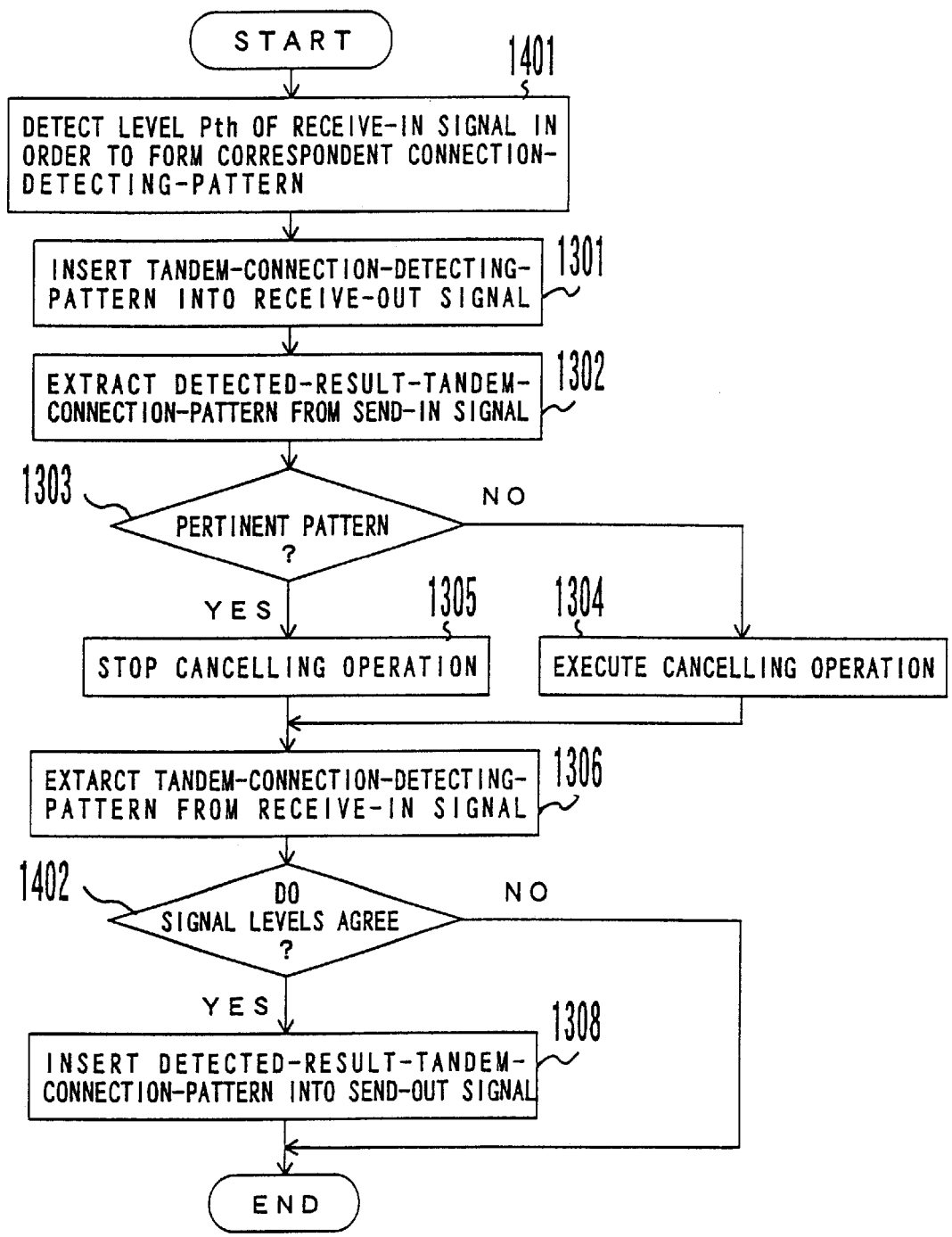
FIG. 14 is a flowchart showing the operation (#2) of the fourth preferred embodiment of the present invention.

Next, FIG. 14 is a flowchart showing the operation (#2) of the echo canceller in the fourth preferred embodiment of the present invention.

In the figure, steps which bear the same numerals as in the foregoing case of FIG. 13 realize the same functions as in FIG. 13.

The points of difference of FIG. 14 from FIG. 13 are as follows:

The tandem-connection-detecting-pattern inserting unit 902 included in the echo canceller 1201 detects the signal level "Pth" of the receive-in signal 205, and inserts into the receive-out signal 206 a tandem-connection-detecting-pattern composed of k bits as corresponds to the detected signal level "Pth" (step 1401 in FIG. 14). Besides, when the tandem-connection-detecting-pattern detecting unit 903 included in the echo canceller 1201 has detected the tandem-connection-detecting-pattern from the receive-in signal 205, it causes the detected-result-tandem-connection-pattern inserting unit 1203 to insert the detected-result-tandem-connection-pattern into the send-out signal 208 on condition that the difference between a signal level corresponding to the detected pattern and the signal level "Pth" of the receive-in signal 205 being currently detected by the tandem-connection-detecting-pattern detecting unit 903 itself lies within a predetermined threshold value (step 1402→step 1308 in FIG. 14).

Owing to such a contrivance, the detecting precision of the tandem connection can be enhanced.

Fifth Preferred Embodiment of the Invention

Figure 15:
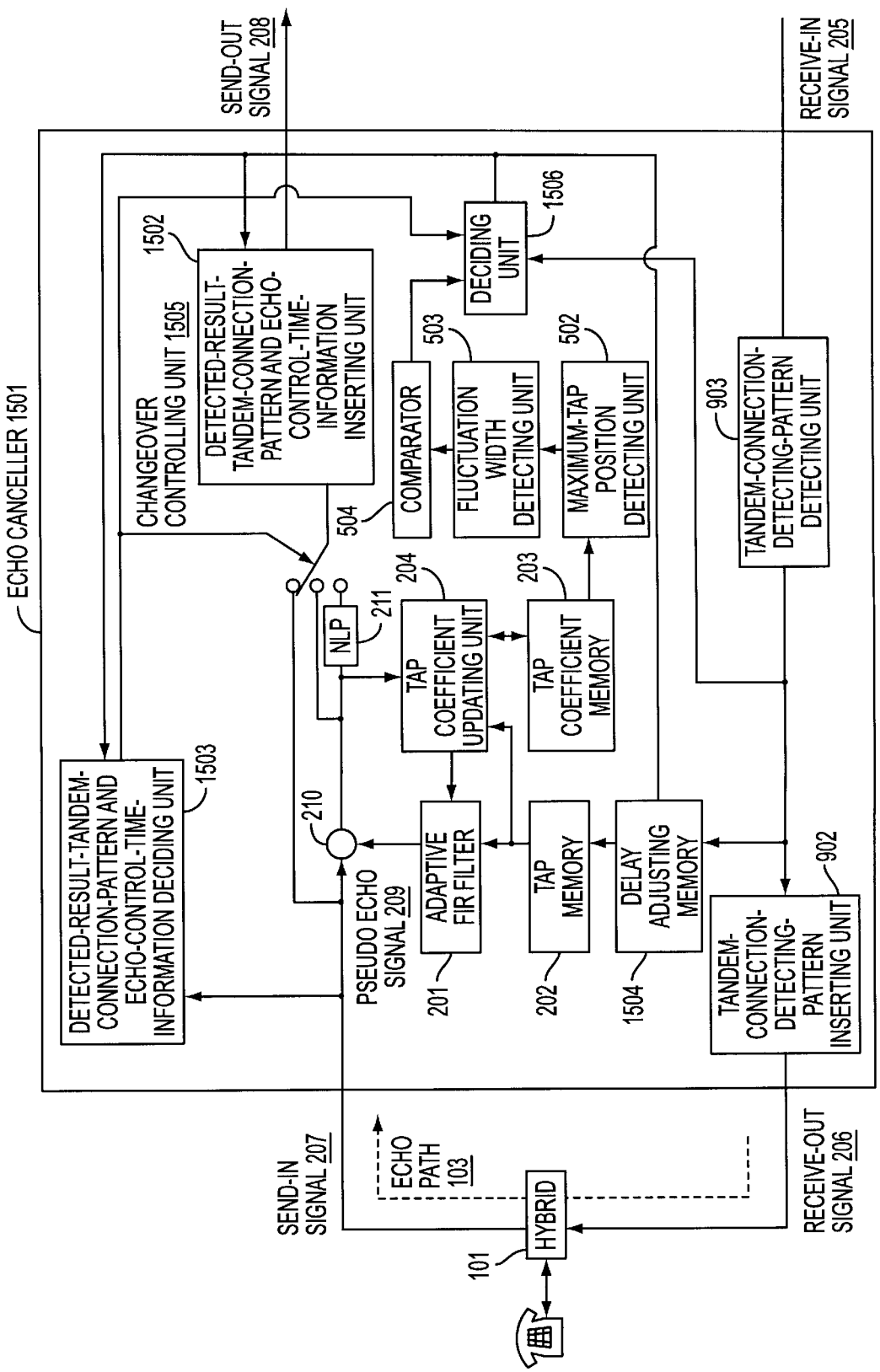
FIG. 15 is a block diagram showing the construction of the fifth preferred embodiment of the present invention.
Figure 16:
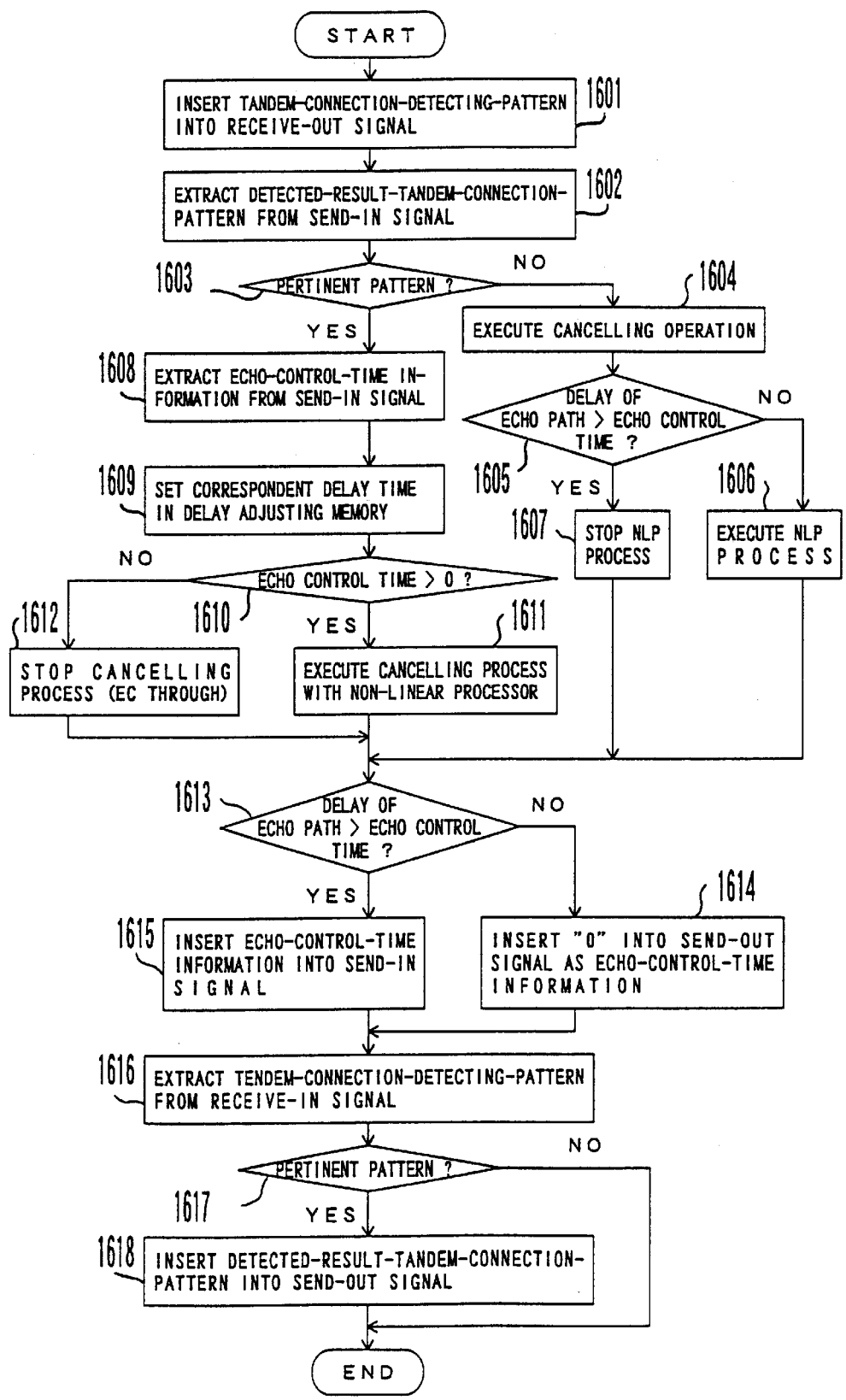
FIG. 16 is a flowchart showing the operation of the fifth preferred embodiment of the present invention.

FIG. 15 is a block diagram showing the construction of an echo canceller in the fifth preferred embodiment of the present invention, while FIG. 16 is a flowchart showing the operation of the echo canceller.

In FIG. 15, respective portions which bear the same numerals as in the foregoing cases of FIGS. 5, 9, 1, and 2, have the same functions as in these figures. Besides, of functions which are possessed by a detected-result-tandem-connection-pattern inserting unit 1502 for a detected-result-tandem-connection-pattern and for echo-control-time information, the function of inserting the detected-result-tandem-connection-pattern into a send-out signal 208, is identical to the function which is possessed by the detected-result-tandem-connection-pattern inserting unit 1203 shown in FIG. 12. Likewise, of functions which are possessed by a detected-result-tandem-connection-pattern and echo-control-time-information deciding unit 1503 for a detected-result-tandem-connection-pattern and for echo-control-time information, the function of detecting the detected-result-tandem-connection-pattern from a send-in signal 207 and rendering the decision is identical to the function which is possessed by the detected-result-tandem-connection-pattern deciding unit 1202 shown in FIG. 12.

The fourth preferred embodiment features that, when the transmission delay of an echo path 103 has exceeded the echo control time of the echo-path-side echo canceller 1501 in the state of the tandem connection of the echo cancellers 1501, the echo-path-side echo canceller 1501 stops only the operation of an NLP 211, and that the other echo canceller 1501 executes the echo cancelling operation in cooperation with the echo-path-side echo canceller 1501 without entirely stopping the echo cancelling operation.

First, the detected-result-tandem-connection-pattern and echo-control-time-information deciding unit 1503 included in the echo canceller 1501 nearest to the side of the echo path 103 (namely, the "echo-path-side echo canceller 1501") tries to detect the detected-result-tandem-connection-pattern from the send-in signal 207 (step 1602 in FIG. 16). The detected-result-tandem-connection-pattern, however, cannot be detected from the send-in signal 207 by reason that the send-in signal 207 is a signal on the side of the echo path 103, and that merely a hybrid device 101 exists on this side (that is, the decision of step 1603 in FIG. 16 is NO).

In this case, the detected-result-tandem-connection-pattern and echo-control-time-information deciding unit 1503 included in the echo-path-side echo canceller 1501 commands a changeover controlling unit 1505 to select the output of a subtracter 210 which is executing a linear, echo cancelling operation (step 1604 in FIG. 16).

Simultaneously with this operation, a maximum-tap position detecting unit 502, a fluctuation width detecting unit 503 and a comparator 504 which are included in the echo-path-side echo canceller 1501 execute the control operation described before as to the first preferred embodiment of the present invention. Further, a deciding unit 1506 decides whether or not a receive-in signal 205 is a narrow-band signal, thereby to decide whether or not the transmission delay of the echo path 103 has exceeded the echo control time (step 1605 in FIG. 16).

Herein, in a case where the deciding unit 1506 has decided that the transmission delay of the echo path 103 does not exceed the echo control time of the echo-path-side echo canceller 1501, it commands the changeover controlling unit 1505 to select the output of the NLP 211 which is executing a nonlinear, echo cancelling operation (step 1605→step 1606 in FIG. 16). That is, in this case, the echo-path-side echo canceller 1501 executes the ordinary, echo cancelling operation by the subtracter 210 and the NLP 211 which are included therein.

On the other hand, in a case where the deciding unit 1506 has decided that the transmission delay of the echo path 103 exceeds the echo control time of the echo-path-side echo canceller 1501, it commands the changeover controlling unit 1505 to select only the output of the subtracter 210 which is executing the linear, echo cancelling operation, without selecting the output of the NLP 211 which is executing the nonlinear, echo cancelling operation (step 1605→step 1607 in FIG. 16). That is, in this case, the echo-path-side echo canceller 1501 executes the linear, echo cancelling operation in cooperation with the other echo canceller 1501 as will be described later.

Simultaneously with the above operation, in a case where the deciding unit 1506 in the echo-path-side echo canceller 1501 has decided that the transmission delay of the echo path 103 exceeds the echo control time of the echo-path-side echo canceller 1501, the detected-result-tandem-connection-pattern and echo-control-time-information inserting unit 1502 inserts the echo-control-time information into the send-out signal 208 (step 1613→step 1615 in FIG. 16). An example of a method for the insertion is similar to the example of the method shown in FIG. 10 referred to in the description of the third preferred embodiment of the present invention.

To the contrary, in a case where the deciding unit 1506 has decided that the transmission delay of the echo path 103 does not exceed the echo control time of the echo-path-side echo canceller 1501, the detected-result-tandem-connection-pattern and echo-control-time-information inserting unit 1502 inserts "0" as the echo-control-time information into the send-out signal 208 (step 1613→step 1614 in FIG. 16).

In this way, when the transmission delay of the echo path 103 has exceeded the echo control time of the echo-path-side echo canceller 1501, the echo-control-time information is reported to the other echo canceller 1501, whereby the other echo canceller 1501 can execute the echo cancelling operation in cooperation with the echo-path-side echo canceller 1501 as will be described later.

Further, a tandem-connection-detecting-pattern detecting unit 903 included in the echo-path-side echo canceller 1501 detects from the receive-in signal 205 the tandem-connection-detecting-pattern inserted by a tandem-connection-detecting-pattern inserting unit 902 which is included in the other echo canceller 1501 at the preceding stage (step 1616 in FIG. 16).

In this case, the detected-result-tandem-connection-pattern and echo-control-time-information inserting unit 1502 included in the echo-path-side echo canceller 1501 inserts the detected-result-tandem-connection-pattern different from the tandem-connection-detecting-pattern, into the send-out signal 208 when the detected-result-tandem-connection-pattern and echo-control-time-information inserting unit 1502 is reported by the tandem-connection-detecting-pattern detecting unit 903 (step 1617→step 1618 in FIG. 16).

In contrast, the tandem-connection-detecting-pattern inserting unit 902 included in the preceding-stage echo canceller 1501 which is connected to the echo-path-side echo canceller 1501 inserts the tandem-connection-detecting-pattern into a receive-out signal 206 which proceeds toward the echo-path-side echo canceller 1501 (step 1601 in FIG. 16). Besides, the detected-result-tandem-connection-pattern and echo-control-time-information deciding unit 1503 included in the preceding-stage echo canceller 1501 detects from the send-in signal 207 the detected-result-tandem-connection-pattern inserted by the detected-result-tandem-connection-pattern and echo-control-time-information inserting unit 1502 which is included in the echo-path-side echo canceller 1501 (step 1602 in FIG. 16).

When the detected-result-tandem-connection-pattern and echo-control-time-information deciding unit 1503 has detected the detected-result-tandem-connection-pattern (that is, the decision of step 1603 in FIG. 16 is YES), it further extracts the echo-control-time information inserted by the succeeding-stage echo canceller 1501, from the send-in signal 207 (step 1608 in FIG. 16), and it sets a delay time corresponding to the extracted information, in a delay adjusting memory 1504 (step 1609 in FIG. 16).

Herein, in a case where the echo control time indicated by the extracted echo-control-time information is "0", the detected-result-tandem-connection-pattern and echo-control-time-information deciding unit 1503 causes the changeover controlling unit 1505 to entirely stop the echo cancelling operation (step 1610→step 1612 in FIG. 16), because the tandem-connected echo canceller 1501 of the detected-result-tandem-connection-pattern and echo-control-time-information deciding unit 1503 itself ought not to execute the echo cancelling operation. That is, the changeover controlling unit 1505 delivers the send-in signal 207 as the send-out signal 208 directly without selecting the output of the subtracter 210 as well as the NLP 211.

On the other hand, in a case where the echo control time indicated by the extracted echo-control-time information is greater than "0", the detected-result-tandem-connection-pattern and echo-control-time-information deciding unit 1503 commands the changeover controlling unit 1505 to select only the output of the subtracter 210 under the execution of the linear, echo cancelling operation, without selecting the output of the NLP 211 under the execution of the nonlinear, echo cancelling operation (step 1610→step 1611 in FIG. 16), because the tandem-connected echo canceller 1501 of the detected-result-tandem-connection-pattern and echo-control-time-information deciding unit 1503 itself ought to execute the linear, echo cancelling operation in cooperation with the other echo canceller 1501.

In this case, the receive-in signal 205 is delayed a time period corresponding to the echo control time based on the echo cancelling operation in the succeeding-stage echo canceller 1501, by the delay adjusting memory 1504, and the delayed signal is used for the echo cancelling operation. Thus, the cooperative, echo cancelling operations by the plurality of echo cancellers 1501 are realized.

What is claimed is:

1. An echo canceller wherein a group of tap coefficients are successively updated on the basis of a residual echo signal and receive-in signals successively received, a pseudo echo signal is generated by a filter whose inputs are the receive-in signals and whose filter coefficients are the group of tap coefficients, the pseudo echo signal is subtracted from a send-in signal, thereby to execute an echo cancelling operation for the send-in signal, and a send-out signal is delivered on the basis of a result of the subtraction; comprising:

an echo-cancelling-operation-state detecting unit which detects a state where a transmission delay time of an echo path exceeds an echo control time of said echo canceller, on the basis of the tap coefficients successively updated; and an echo-cancelling-operation stopping unit which stops the echo cancelling operation, including a process for subtracting said pseudo echo signal from said send-in signal, when the state has been detected.

2. An echo canceller as defined in claim 1, wherein said echo-cancelling-operation-state detecting unit includes:

a maximum-tap-position detecting unit which detects a tap position of the tap coefficient having a maximum value, in a state where a predetermined time period has lapsed since beginning of a call and where the receive-in signal is not a narrow-band signal;

a fluctuation-width detecting unit which detects a fluctuation width of the tap position; and a comparison unit which detects said state where the transmission delay time of the echo path exceeds the echo control time of said echo canceller, on the basis of the detected fluctuation width.

3. An echo canceller wherein a group of tap coefficients are successively updated on the basis of a residual echo signal and receive-in signals successively received, a pseudo echo signal is generated by a filter whose inputs are the receive-in signals and whose filter coefficients are the group of tap coefficients, the pseudo echo signal is subtracted from a send-in signal, thereby to execute an echo cancelling operation for the send-in signal, and a send-out signal is delivered on the basis of a result of the subtraction; comprising:

a linear-data-0 detecting unit which detects a state where "0" of linear data succeed as said send-in signal; and an echo-cancelling-operation stopping unit which stops the echo cancelling operation, including a process for subtracting said pseudo echo signal from said send-in signal, when the state has been detected.

4. An echo canceller wherein a group of tap coefficients are successively updated on the basis of a residual echo signal and receive-in signals successively received, a pseudo echo signal is generated by a filter whose inputs are the receive-in signals and whose filter coefficients are the group of tap coefficients, the pseudo echo signal is subtracted from a send-in signal, thereby to execute an echo cancelling operation for the send-in signal, and a send-out signal is delivered on the basis of a result of the subtraction; comprising:

a first, tandem-connection-detecting-pattern inserting unit which inserts a tandem-connection-detecting-pattern into the receive-in signal, and which delivers a resulting signal as a receive-out signal;

a second, tandem-connection-detecting-pattern inserting unit which inserts the tandem-connection-detecting-pattern into the send-out signal, and which delivers a resulting signal;

a first, tandem-connection-detecting-pattern detecting unit which extracts said tandem-connection-detecting-pattern from said receive-in signal;

a second, tandem-connection-detecting-pattern detecting unit which extracts said tandem-connection-detecting-pattern from said send-in signal; and an echo-cancelling-operation stopping unit which stops the echo cancelling operation, including a process for subtracting said pseudo echo signal from said send-in signal, when said tandem-connection-detecting-pattern has been extracted by both of said first, tandem-connection-detecting-pattern detecting unit and said second, tandem-connection-detecting-pattern detecting unit.

5. An echo canceller as defined in claim 4, wherein said tandem-connection-detecting-pattern is transmitted in such a way that, in a train of samples of a digital signal which is selected from the group consisting of said receive-in signal, the receive-out signal, said send-in signal and said send-out signal, least significant bits of a plurality of samples at intervals of a predetermined number of samples are bit-stolen, whereupon bits of bit data constituting said tandem-connection-detecting-pattern are respectively inserted into the plurality of least significant bits.

6. An echo canceller wherein a group of tap coefficients are successively updated on the basis of a residual echo signal and receive-in signals successively received, a pseudo echo signal is generated by a filter whose inputs are the receive-in signals and whose filter coefficients are the group of tap coefficients, the pseudo echo signal is subtracted from a send-in signal, thereby to execute an echo cancelling operation for the send-in signal, and a send-out signal is delivered on the basis of a result of the subtraction; comprising:

a tandem-connection-detecting-pattern inserting unit which inserts a tandem-connection-detecting-pattern into the receive-in signal, and which delivers a resulting signal as a receive-out signal;

a tandem-connection-detecting-pattern detecting unit which extracts the tandem-connection-detecting-pattern from said receive-in signal;

a detected-result-tandem-connection-pattern inserting unit which inserts a detected-result-tandem-connection-pattern into the send-out signal and delivers a resulting signal, when said tandem-connection-detecting-pattern detecting unit has extracted said tandem-connection-detecting-pattern;

a detected-result-tandem-connection-pattern detecting unit which extracts the detected-result-tandem-connection-pattern from said send-in signal; and an echo-cancelling-operation stopping unit which stops the echo cancelling operation, including a process for subtracting said pseudo echo signal from said send-in signal, when said detected-result-tandem-connection-pattern has been extracted by said detected-result-tandem-connection-pattern detecting unit.

7. An echo canceller as defined in claim 6, wherein:

said tandem-connection-detecting-pattern inserting unit inserts the tandem-connection-detecting-pattern corresponding to a signal level of said receive-in signal, into said receive-in signal, and which delivers a resulting signal as the receive-out signal; and said detected-result-tandem-connection-pattern inserting unit inserts said detected-result-tandem-connection-pattern into said send-out signal and delivers a resulting signal, when said tandem-connection-detecting-pattern extracted by said tandem-connection-detecting-pattern detecting unit corresponds to the signal level of the current receive-in signal.

8. An echo canceller as defined in claim 6, wherein each of said tandem-connection-detecting-pattern and said detected-result-tandem-connection-pattern is transmitted in such a way that, in a train of samples of a digital signal which is selected from the group consisting of said receive-in signal, the receive-out signal, said send-in signal and said send-out signal, least significant bits of a plurality of samples at intervals of a predetermined number of samples are bit-stolen, whereupon bits of bit data constituting said each of said tandem-connection-detecting-pattern and said detected-result-tandem-connection-pattern are respectively inserted into the plurality of least significant bits.

9. An echo canceller wherein a group of tap coefficients are successively updated on the basis of a residual echo signal and receive-in signals successively received, a pseudo echo signal is generated by a filter whose inputs are the receive-in signals and whose filter coefficients are the group of tap coefficients, the pseudo echo signal is subtracted from a send-in signal, thereby to execute an echo cancelling operation for the send-in signal, and a send-out signal is delivered in terms of a result of the subtraction; comprising:

an echo-cancelling-operation-state detecting unit which detects a state where a transmission delay time of an echo path exceeds an echo control time of said echo canceller, on the basis of the tap coefficients successively updated;

an echo-control-time-information inserting unit which inserts information on the echo control time into the send-out signal so as to report the state to another echo canceller connected in tandem with the first-mentioned echo canceller, when said state has been detected;

an echo-control-time-information detecting unit which detects the information on said echo control time from said send-in signal; and a delay adjusting unit which delays the receive-in signal a time period corresponding to the detected information on said echo control time, and which inputs a resulting signal to the filter;

wherein the plurality of tandem-connected echo cancellers execute the echo cancelling operations in cooperation.

10. A method of controlling an echo canceller wherein a group of tap coefficients are successively updated on the basis of a residual echo signal and receive-in signals successively received, a pseudo echo signal is generated by a filter whose inputs are the receive-in signals and whose filter coefficients are the group of tap coefficients, the pseudo echo signal is subtracted from a send-in signal, thereby to execute an echo cancelling operation for the send-in signal, and a send-out signal is delivered on the basis of a result of the subtraction; comprising the steps of:

detecting a state where a transmission delay time of an echo path exceeds an echo control time of said echo canceller, on the basis of the tap coefficients successively updated; and stopping the echo cancelling operation, which includes a process for subtracting said pseudo echo signal from said send-in signal, when the state has been detected.

11. A method of controlling an echo canceller as defined in claim 10, comprising the steps of:

detecting a tap position of the tap coefficient having a maximum value, in a state where a predetermined time period has lapsed since beginning of a call and where the receive-in signal is not a narrow-band signal;

detecting a fluctuation width of the tap position; and detecting said state where the transmission delay time of the echo path exceeds the echo control time of said echo canceller, on the basis of the detected fluctuation width.

12. A method of controlling an echo canceller wherein a group of tap coefficients are successively updated on the basis of a residual echo signal and receive-in signals successively received, a pseudo echo signal is generated by a filter whose inputs are the receive-in signals and whose filter coefficients are the group of tap coefficients, the pseudo echo signal is subtracted from a send-in signal, thereby to execute an echo cancelling operation for the send-in signal, and a send-out signal is delivered on the basis of a result of the subtraction; comprising the steps of:

detecting a state where "0"s of linear data succeed as said send-in signal; and stopping the echo cancelling operation, which includes a process for subtracting said pseudo echo signal from said send-in signal, when the state has been detected.

13. A method of controlling an echo canceller wherein a group of tap coefficients are successively updated on the basis of a residual echo signal and receive-in signals successively received, a pseudo echo signal is generated by a filter whose inputs are the receive-in signals and whose filter coefficients are the group of tap coefficients, the pseudo echo signal is subtracted from a send-in signal, thereby to execute an echo cancelling operation for the send-in signal, and a send-out signal is delivered on the basis of a result of the subtraction; comprising the steps of:

inserting a tandem-connection-detecting-pattern into the receive-in signal, and delivering a resulting signal as a receive-out signal;

inserting the tandem-connection-detecting-pattern into the send-out signal, and delivering a resulting signal;

extracting said tandem-connection-detecting-pattern from said receive-in signal;

extracting said tandem-connection-detecting-pattern from said send-in signal; and stopping the echo cancelling operation, which includes a process for subtracting said pseudo echo signal from said send-in signal, when said tandem-connection-detecting-pattern has been extracted from both of said receive-in signal and said send-in signal.

14. A method of controlling an echo canceller as defined in claim 13, wherein said tandem-connection-detecting-pattern is transmitted in such a way:

that, in a train of samples of a digital signal which is selected from the group consisting of said receive-in signal, the receive-out signal, said send-in signal and said send-out signal, least significant bits of a plurality of samples at intervals of a predetermined number of samples are bit-stolen; and that bits of bit data constituting said tandem-connection-detecting-pattern are respectively inserted into the plurality of least significant bits.

15. A method of controlling an echo canceller wherein a group of tap coefficients are successively updated on the basis of a residual echo signal and receive-in signals successively received, a pseudo echo signal is generated by a filter whose inputs are the receive-in signals and whose filter coefficients are the group of tap coefficients, the pseudo echo signal is subtracted from a send-in signal, thereby to execute an echo cancelling operation for the send-in signal, and a send-out signal is delivered on the basis of a result of the subtraction; comprising the steps of:

inserting a tandem-connection-detecting-pattern into the receive-in signal, and delivering a resulting signal as a receive-out signal;

extracting the tandem-connection-detecting-pattern from said receive-in signal;

inserting a detected-result-tandem-connection-pattern into the send-out signal and delivering a resulting signal, when said tandem-connection-detecting-pattern has been extracted;

extracting the detected-result-tandem-connection-pattern from said send-in signal; and stopping the echo cancelling operation, which includes a process for subtracting said pseudo echo signal from said send-in signal, when said detected-result-tandem-connection-pattern has been extracted.

16. A method of controlling an echo canceller as defined in claim 15, comprising the steps of:

inserting the tandem-connection-detecting-pattern correspondent to a signal level of said receive-in signal, into said receive-in signal, and delivering a resulting signal as the receive-out signal; and inserting said detected-result-tandem-connection-pattern into said send-out signal and delivering a resulting signal, when said tandem-connection-detecting-pattern extracted from said receive-in signal corresponds to the signal level of the current receive-in signal.

17. A method of controlling an echo canceller as defined in claim 15, wherein each of said tandem-connection-detecting-pattern and said detected-result-tandem-connection-pattern is transmitted in such a way:

that, in a train of samples of a digital signal which is selected from the group consisting of said receive-in signal, the receive-out signal, said send-in signal and said send-out signal, least significant bits of a plurality of samples at intervals of a predetermined number of samples are bit-stolen; and that bits of bit data constituting said each of said tandem-connection-detecting-pattern and said detected-result-tandem-connection-pattern are respectively inserted into the plurality of least significant bits.

18. A method of controlling an echo canceller wherein a group of tap coefficients are successively updated on the basis of a residual echo signal and receive-in signals successively received, a pseudo echo signal is generated by a filter whose inputs are the receive-in signals and whose filter coefficients are the group of tap coefficients, the pseudo echo signal is subtracted from a send-in signal, thereby to execute an echo cancelling operation for the send-in signal, and a send-out signal is delivered on the basis of a result of the subtraction; comprising the steps of:

detecting a state where a transmission delay time of an echo path exceeds an echo control time of said echo canceller, on the basis of the tap coefficients successively updated;

inserting information on the echo control time into the send-out signal so as to report the state to another echo canceller connected in tandem with the first-mentioned echo canceller, when said state has been detected;

detecting the information on said echo control time from said send-in signal; and delaying the receive-in signal a time period correspondent to the detected information on said echo control time, and inputting a resulting signal to the filter;

wherein the plurality of tandem-connected echo cancellers execute the echo cancelling operations in cooperation.

* * * * *